(12) United States Patent
Vigneau

(10) Patent No.: US 9,323,824 B2
(45) Date of Patent: Apr. 26, 2016

(54) MANAGING DATA SELECTION BASED ON ATTRIBUTES

(75) Inventor: Joyce L. Vigneau, Stoneham, MA (US)

(73) Assignee: Ab Initio Technology LLC, Lexington, MA (US)

( * ) Notice: Subject to any disclaimer, the term of this patent is extended or adjusted under 35 U.S.C. 154(b) by 69 days.

(21) Appl. No.: 13/230,411

(22) Filed: Sep. 12, 2011

(65) Prior Publication Data

US 2012/0089633 A1 Apr. 12, 2012

Related U.S. Application Data

(60) Provisional application No. 61/381,744, filed on Sep. 10, 2010.

(51) Int. Cl.
*G06F 17/30* (2006.01)
*G06Q 30/02* (2012.01)

(52) U.S. Cl.
CPC .... *G06F 17/30592* (2013.01); *G06F 17/30864* (2013.01); *G06Q 30/02* (2013.01)

(58) Field of Classification Search
CPC ................................................. G06F 17/30864
See application file for complete search history.

(56) References Cited

U.S. PATENT DOCUMENTS

| 7,802,206 | B1* | 9/2010 | Davis et al. ................. 715/864 |
| 2001/0039544 | A1* | 11/2001 | Chakrabarti et al. ........... 707/5 |
| 2003/0140059 | A1 | 7/2003 | Ishizaka |
| 2004/0236728 | A1 | 11/2004 | Newman et al. |
| 2007/0255833 | A1 | 11/2007 | Sharma et al. |
| 2008/0027908 | A1* | 1/2008 | Durbeck et al. .................. 707/2 |
| 2010/0153409 | A1 | 6/2010 | Joshi et al. |
| 2011/0012930 | A1* | 1/2011 | Davis et al. ................... 345/666 |

FOREIGN PATENT DOCUMENTS

| JP | 2000-250798 | 9/2000 |
| JP | 2003-216464 | 7/2003 |

OTHER PUBLICATIONS

International Search Report and Written Opinion, PCT/US2011/051423, mailed Nov. 7, 2011, 9 pages.
Japanese Office Action issued in JP2013-528372, mailed Sep. 2, 2015, 4 pages.

* cited by examiner

*Primary Examiner* — Hosain Alam
*Assistant Examiner* — Tuan-Khanh Phan
(74) *Attorney, Agent, or Firm* — Fish & Richardson P.C.

(57) ABSTRACT

An interface is provided on a computing device for interacting with data stored in a data repository. Input is received including information identifying two or more attributes, and information indicating an order for the identified attributes. A hierarchical data structure is stored, with an order of hierarchy levels corresponding to the indicated order. Multiple attribute values for the attributes are determined. The method includes assigning to each node of a first level at least one of the attribute values of a first attribute, and assigning to each node of a second level at least one of the attribute values of a second attribute, each of the nodes of the second level also being assigned respective ones of the attribute values assigned to one or more nodes of preceding levels. The interface is displayed including displaying interface elements associated with each of the nodes.

78 Claims, 19 Drawing Sheets

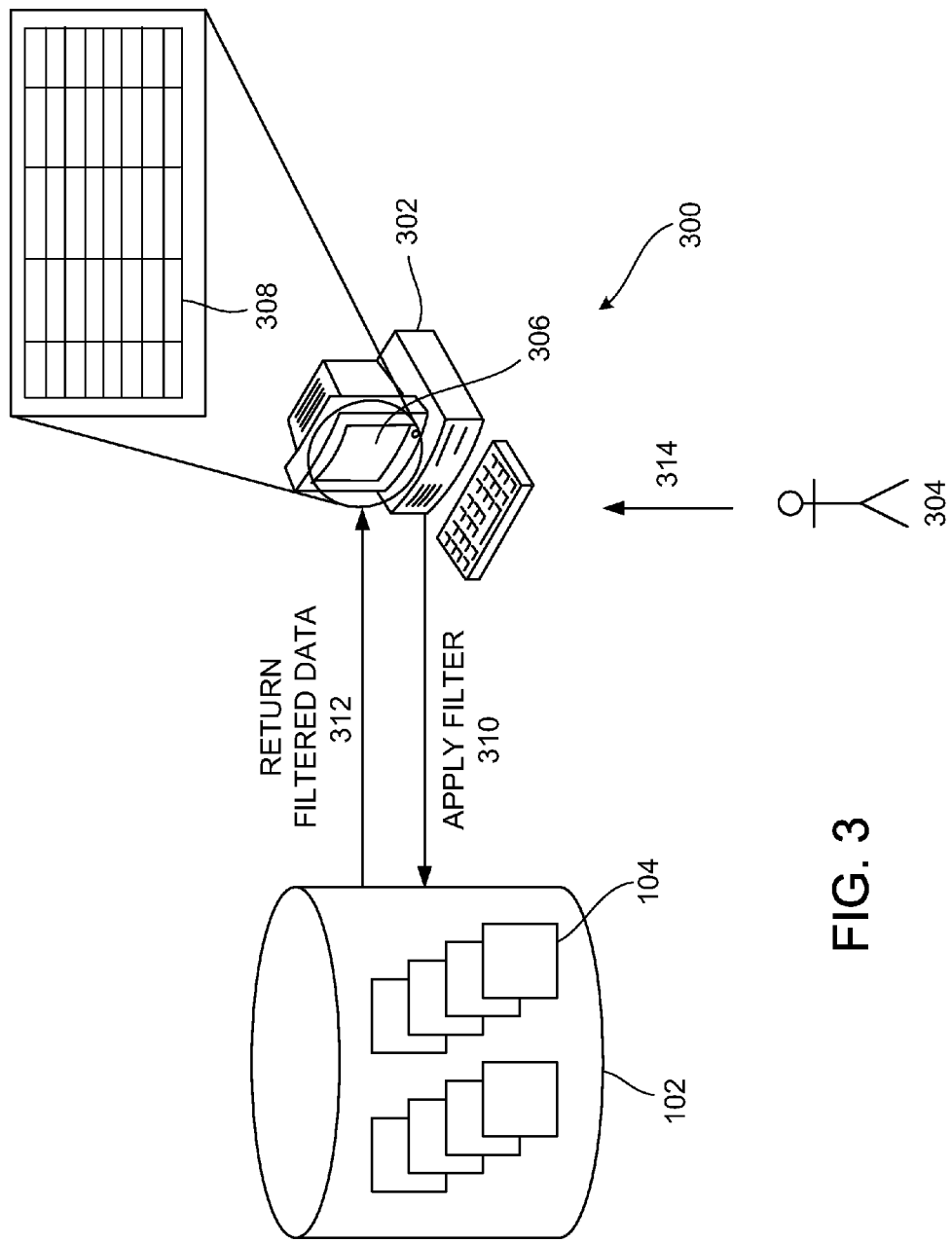

Issue Severity:
Run Status:
PROCESS_COUNTRY:

| ● | ▲ | | 👤 | All Groups + |
|---|---|---|---|---|
| Unstarted | | | Running | Unst... Completed | × × × |
| MX | CN | US | CN US | US CN US |

Error > Unstarted: 200 jobs — 401

FIG. 4B

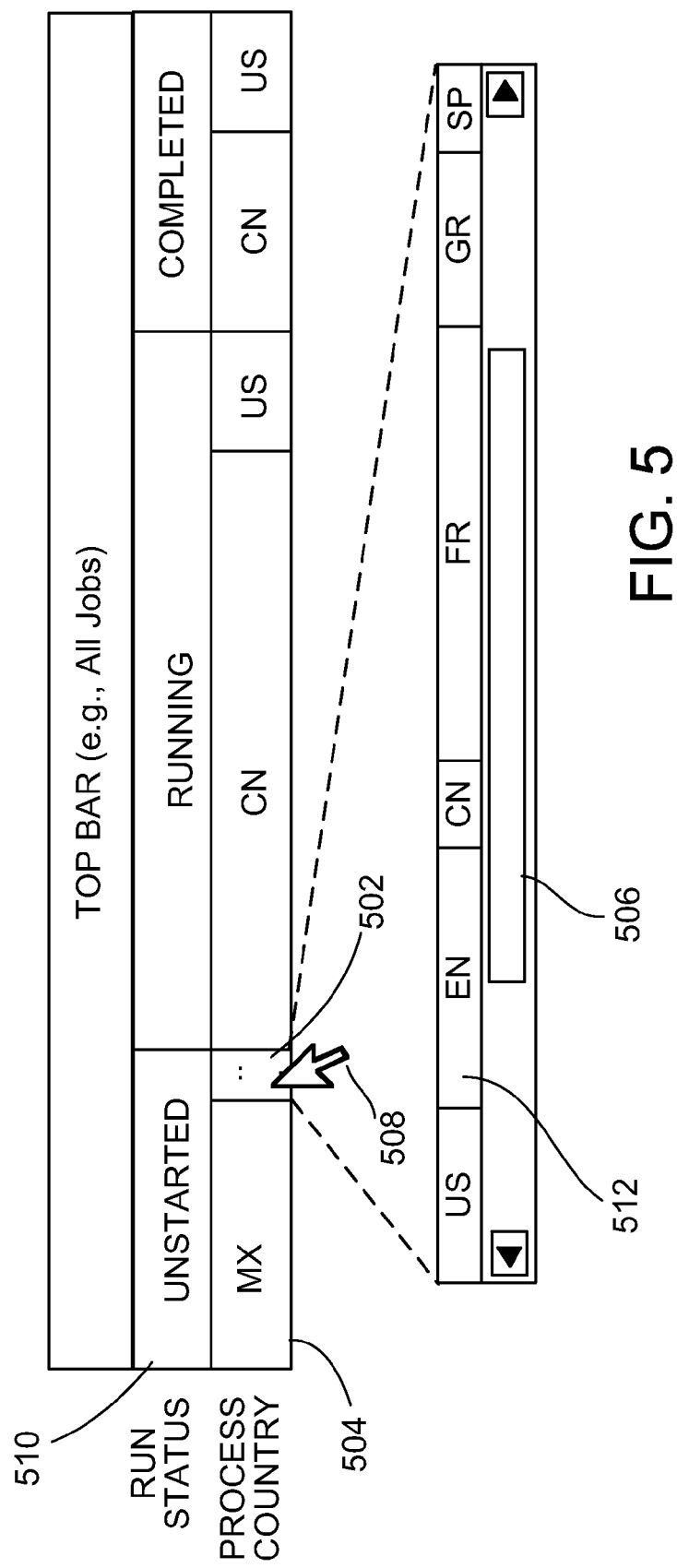

| All Jobs | Group by | Run status - overview ▶ | ☐ ☑ Show jobs by parent ♆ | | | | | | | + | Total: 345 |
| --- | --- | --- | --- | --- | --- | --- | --- | --- | --- | --- | --- |
| All | | | | | | | | | | ◀ | ▶ |
| Unstarted | ☐ PROCESS_COUNTRY: | | CN | MX | | US | | | Select All | Other | X |
| Running | | | | | | | | | | | |
| Completed | Job Defination | Stat.. | Iss.. Type | E... | Start | End | Progress | A... | P... | P... | B... F... L... B... RANK |
| | US Feed Processing | | | | 08-05 15:00:0 | | | cfac | | US | Unk -1 |
| | US Feed Processing | | | | 08-04 23:00:0 | | | cfac | | US | Unk -1 |
| | Operational Systems | | | | 08-04 23:00:0 | | | cfac | | | Unk -1 |
| | Product Processing | | | | 08-04 23:00:0 | | | cfac | | | Unk -1 |
| | Mexico Feed Processi | | | | 08-04 22:00:0 | | | cfac | | | Unk -1 |
| | US Feed Processing | | | | 08-04 22:00:0 | | | cfac | | MX | Unk -1 |
| | Operational Systems | | | | 08-05 15:00:0 | | | cfac | | US | Unk -1 |
| | Product Processing | | | | 08-05 15:00:0 | | | cfac | | | Unk -1 |
| | Canada Feed Process | | | | 08-05 15:00:0 | | | cfac | | CN | Unk -1 |
| | US Feed Processing | | | | 08-05 15:00:0 | | | cfac | | US | Unk -1 |

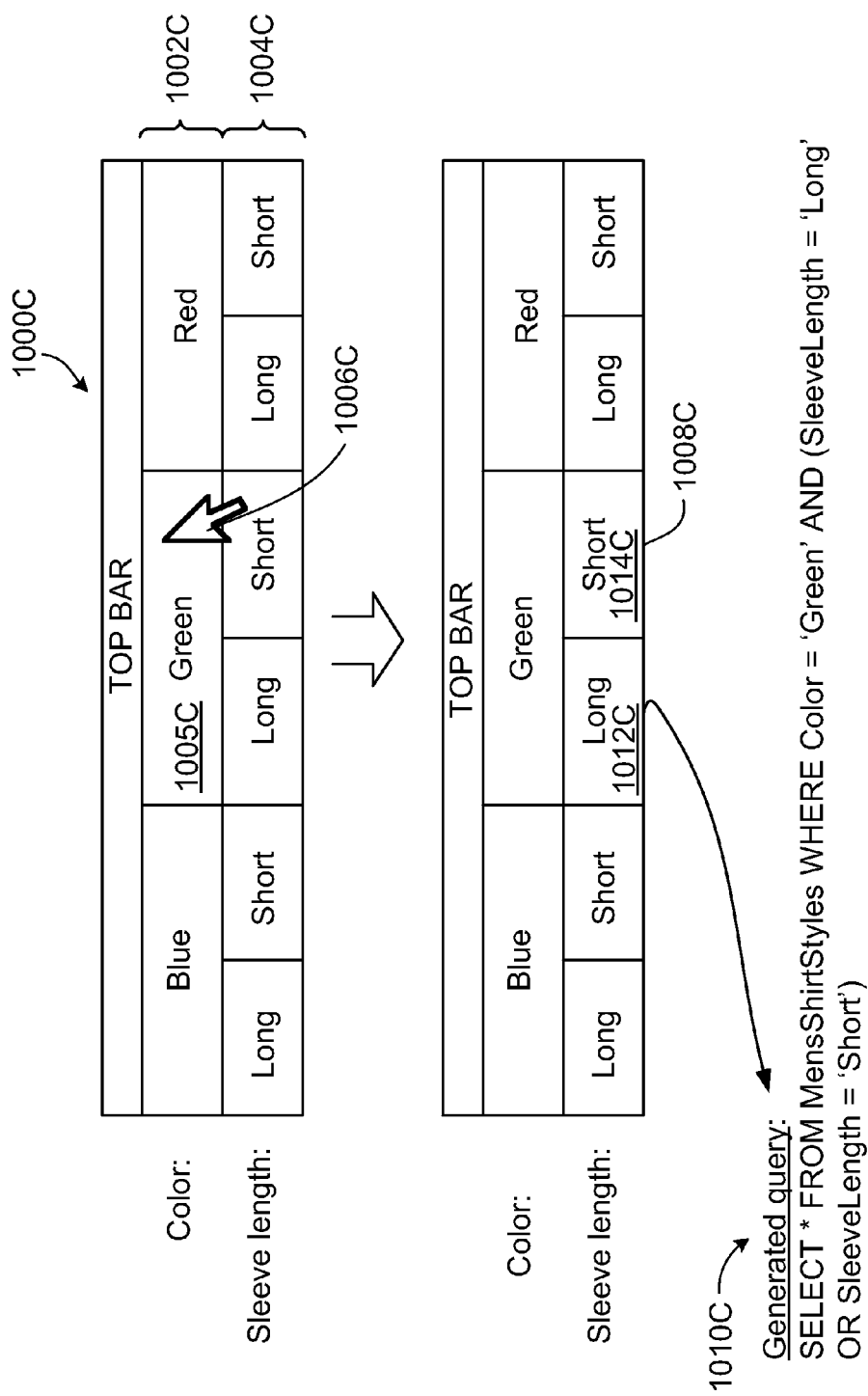

ated to alter the order in which the data elements are grouped. A query is generated in response to receiving input that includes a selection of one or more of the multiple sections, the query being associated with respective data elements of the selected one or more of the multiple sections. The query is altered in response to receiving input that selects or deselects one or more of the one or more of the multiple sections. The selected one or more of the multiple sections
MANAGING DATA SELECTION BASED ON ATTRIBUTES

CROSS-REFERENCE TO RELATED APPLICATIONS

This application claims priority to U.S. Application Ser. No. 61/381,744, filed on Sep. 10, 2010, incorporated herein by reference.

BACKGROUND

This description generally relates to managing data selection based on attributes.

In some examples, data has multiple attributes. This data can be stored in databases and arranged in various forms. To arrange and organize data having multiple attributes, techniques such as calling the data into sortable spreadsheets, graphs, trees, or other hierarchies may be implemented. Once arranged, a user can manipulate the data through a user interface for changing the organization and presentation of the data.

SUMMARY

In one aspect, in general, a method is provided for providing an interface on a computing device for interacting with multi-dimensional data stored in a data repository. The method includes receiving, over an input port of the computing device, input including information identifying two or more attributes of data elements stored in the data repository, and information indicating an order for the identified attributes. The method also includes storing on the computing device a hierarchical data structure, the hierarchical data structure including a hierarchy having a plurality of hierarchy levels that each correspond to one of the identified attributes, with an order of the hierarchy levels corresponding to the indicated order for the identified attributes.

The method also includes processing data in the data repository to store information in the hierarchical data structure used to present the interface on the computing device. The processing includes determining multiple attribute values that appear within the data elements, for the identified attributes, assigning, to each of a plurality of nodes of a first hierarchy level of the hierarchical data structure corresponding to a first attribute of the identified attributes, at least one of the determined attribute values of the first attribute, and assigning, to each of a plurality of nodes of a second hierarchy level of the hierarchical data structure corresponding to a second attribute of the identified attributes, at least one of the determined attribute values of the second attribute, each of the plurality of nodes of the second hierarchy level also being assigned respective ones of the determined attribute values assigned to one or more nodes of preceding hierarchy levels, according to the order of the hierarchy levels, for the corresponding attributes. The method also includes displaying the interface on the computing device, including displaying interface elements associated with each of the nodes according to the hierarchy.

In another aspect, in general, a method is provided for providing an interface on a computing device for interacting with multi-dimensional data stored in a data repository. The method includes storing on the computing device an organizational data structure, and processing data in the data repository to store information in the organizational data structure used to present the interface on the computing device. The processing includes determining at least a first attribute of a plurality of attributes of data elements stored in the data repository, determining multiple attribute values of the first attribute that appear within the data elements, and determining, for each particular attribute value of the multiple attribute values, a number of data elements in a respective subset of data elements that include the particular attribute value. The processing also includes assigning, to each of a plurality of nodes of a first hierarchy level of the organizational data structure corresponding to the first attribute, at least one of the determined attribute values of the first attribute, and respective ones of the determined attribute values assigned to one or more nodes of preceding hierarchy levels, according to an order of a hierarchy of the organizational data structure, for corresponding attributes. The method also includes storing in the organizational data structure information based on the determined numbers of data elements in association with information identifying the first attribute.

Aspects may include one or more of the following features.

A query is generated in response to receiving input that includes a selection of one or more of the nodes of the data structure, each node representing data elements with the combination of attribute values assigned to that node in the hierarchy, with a set of data elements returned by the query corresponding to the union of the data elements represented by each of the individual nodes. At least one of the determined attribute values of the respective attribute are assigned to each of a plurality of nodes of each successive hierarchy level of the hierarchical data structure corresponding to respective attributes of the identified attributes, each of the plurality of nodes of each successive hierarchy level also being assigned respective ones of the determined attribute values assigned to all nodes of preceding hierarchy levels, according to the order of the hierarchy levels, for the corresponding attributes. The interface is presented on the computing device, the interface including a first strip corresponding to the first attribute, the first strip including multiple sections, with a plurality of the multiple sections having a size that is proportional to a corresponding one of the determined numbers of data elements.

The interface includes a control for removing one or more of the first strip and the second strip from the interface. The interface includes a control for adding one or more additional strips to the interface, the one or more additional strips each being associated with an additional attribute. The processing further includes determining a second attribute of data elements stored in the data repository, determining multiple second attribute values of the second attribute that appear within the data elements, determining, for each particular attribute value of the multiple second attribute values, a number of data elements in a respective subset of data elements that include the particular attribute value, and storing in the organizational data structure information based on the determined numbers of data elements in association with information identifying the second attribute. The interface further includes a second strip corresponding to the second attribute, the second strip including multiple sections.

Each section of the first and second strips represents a different respective group of the data elements. An ordering of the first strip with respect to the second strip specifies an order in which the data elements are grouped. The ordering is altered to alter the order in which the data elements are grouped. A query is generated in response to receiving input that includes a selection of one or more of the multiple sections, the query being associated with respective data elements of the selected one or more of the multiple sections. The query is altered in response to receiving input that selects or deselects one or more of the one or more of the multiple sections. The selected one or more of the multiple sections include a section of the second strip, the section of the second strip representing a subset of the data elements represented by one of the multiple sections of the first strip. The query is based on one or more sections in one or more strips that precede the second strip in the ordering.

The selected one or more of the multiple sections include two sections of the second strip. The query includes an expression for retrieving data elements represented by a union of each of the two sections in the second strip. Receiving input selecting one or more of the multiple sections of the first strip causes one or more sections of the multiple sections of the second strip to be selected. The first strip does not include respective sections for values of the first attribute that do not appear within the data elements. The user interface is updated in response to data elements being added or removed from the data repository. Updating the user interface includes adding one or more of a strip or a section from the user interface. Updating the user interface includes removing one or more of a strip or a section from the user interface. It is identified that a cursor is hovering over a particular section of the multiple sections of the first strip or the second strip, and, in response to the identifying, presenting information associated with the data elements associated with the particular section. The interface includes a control for selecting all of the sections associated with the user interface. The control includes a strip. At least one section of the multiple sections of the first strip or the second strip represents multiple attribute values.

Aspects can have one or more of the following advantages.

The visual representation within the user interface organizes data by particular attributes, with each strip in a stack of strips corresponding to one of the attributes, with attribute values separating the data elements into groups, and with each group being shown as a section of the strip. By storing in an organizational data structure information indicating determined numbers of data elements in respective subsets of data elements having a particular attribute value, the strips visually representing the attributes can include sections whose sizes are proportional to a corresponding one of the determined numbers of data elements. The sections also enable the ability to select arbitrary sets of data elements having various combinations of attribute values for setting or changing filtering constraints (or other data processing constraints), without requiring multiple steps of navigation over multiple stages of filtering. Additionally, by presenting attribute values that are actually present within data elements, the visual representation can be limited to sections corresponding to filters that yield at least some data. A user does not need to be presented with combinations of attribute values for filtering that would yield no data (i.e., an empty set). The user interface can provide the ability to construct a hierarchy of attributes, where there is not necessarily an intrinsic, natural hierarchy. The stacked strips are able to visually show relationships between potentially disjoint attributes. Rearranging the levels of the hierarchy changes the groupings, enabling a user to quickly focus in on the aspects they care about.

DESCRIPTION OF DRAWINGS

FIG. 3 illustrates a system for grouping multi-dimensional data.

FIG. 4B illustrates a filter strip.

FIG. 5 illustrates a filter strip that includes one form of a bucket section.

FIGS. 7-8 illustrate user interfaces.

DESCRIPTION

Figure 1:
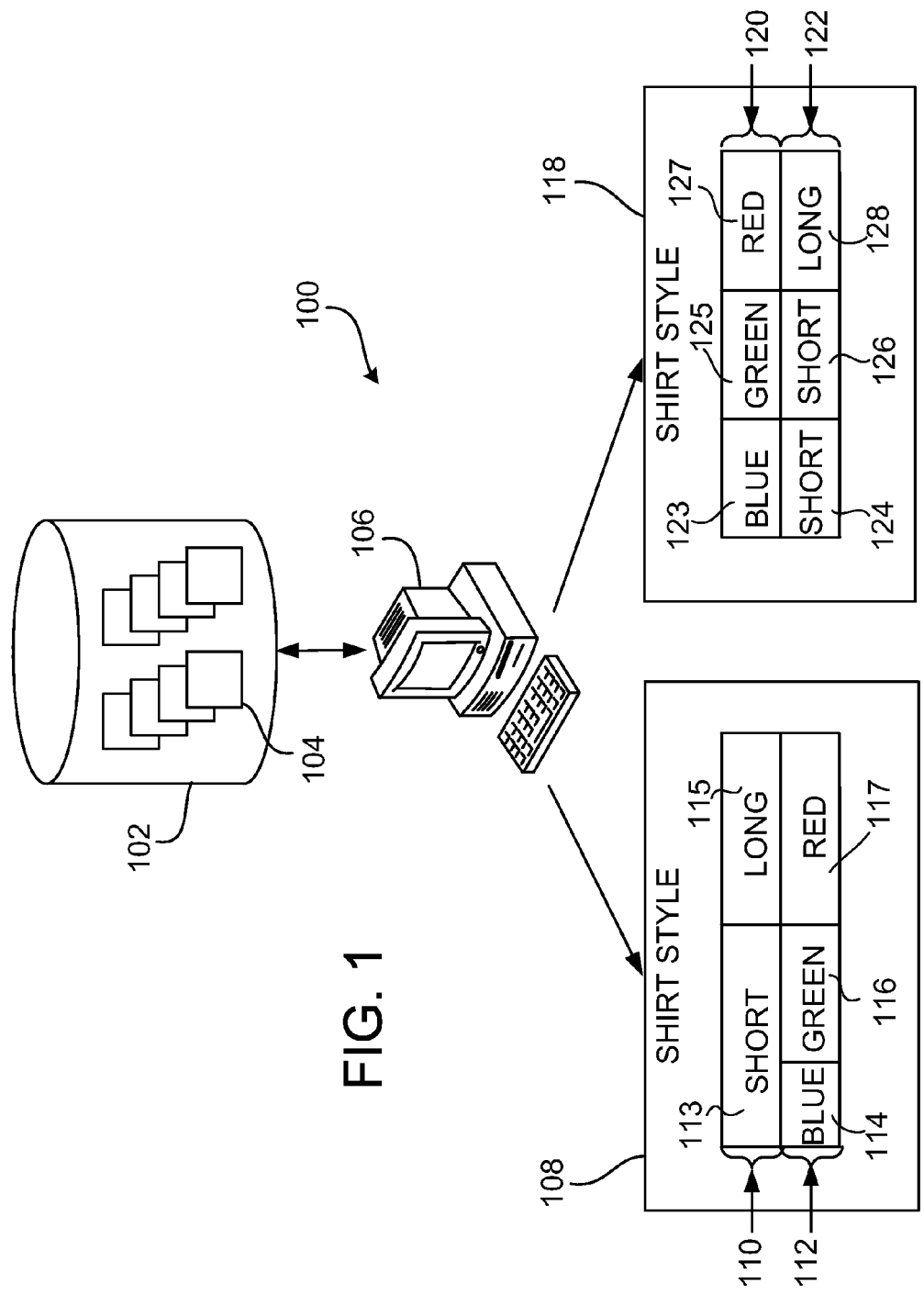
FIG. 1 illustrates a system for dynamically grouping data.

Referring to FIG. 1, a system 100 is shown for processing data 104 that is stored, for example, in a data repository 102, and can be accessed and manipulated by a computing device 106. In some arrangements, the data repository 102 may be integrated into the computing device 106 (e.g., an internal hard drive, etc.) or located external to the computing device 106 (e.g., a remote storage device, server, etc.). The data 104 can be arranged in the data repository 102 in various forms (e.g., database tables), and various techniques can be used to transfer data into and out of the data repository 102, and to manipulate the data 104. In some examples, by accessing (e.g., querying) the data 104, the computing device 106 can retrieve a set of data that is of interest to a user.

To provide a user interface that the user can use to interact with the data, the computing device 106 may organize one or more attributes of the data 104 in a visual arrangement (e.g., on a screen of the device 106), which includes strips that each correspond to a different attribute, and sections within the strips that are based on grouping individual elements (e.g., records) of the data based on values of the corresponding attribute that exist within the elements. The sections can be selected by a user to perform actions such as filtering the data 104. The strips, called "attribute strips" or "filter strips", can be arranged in a stack of multiple strips. In the system of FIG. 1, a first arrangement 108 (e.g., a first stack of attribute strips) includes strips 110, 112 which include sections 113, 115, and 114, 116, 117, respectively. In this example, the first arrangement 108 includes strips that represent attributes relating to shirt styles, with the first strip 110 representing a sleeve length (e.g., long or short) and the second strip 112 representing a shirt color (e.g., blue, green, or red). The computing device 106 can dynamically alter the content of an arrangement based on user interaction. In this example, the computing device 106 dynamically alters the first arrangement 108 to provide a second arrangement 118 (e.g., a second stack of attribute strips) that includes strips 120, 122 having sections 123, 125, 127 and 124, 126, 128, respectively. While various alterations are possible, in this example, the strips of the first arrangement 108 are interchanged. In particular, in the second arrangement 118, the first strip 120 represents shirt color, and the second strip 122 represents the sleeve length. In some examples, the data whose attributes are manipulated in this manner by computing device 106 is "multi-faceted" data that has multiple facets characterizing individual elements of the data (e.g., multi-dimensional data in which a given data element has multiple attributes, possibly with multiple unique values for the respective attributes), such as the data depicted in FIG. 2.

As another example, the first arrangement 108 could also include attributes that represent the status of one or more "jobs," with the first strip 110 representing the country associated with a particular job (sometimes referred to as a "job country"), and the second strip 112 representing execution status associated with a corresponding job. This example will be described in greater detail below.

Figure 2:
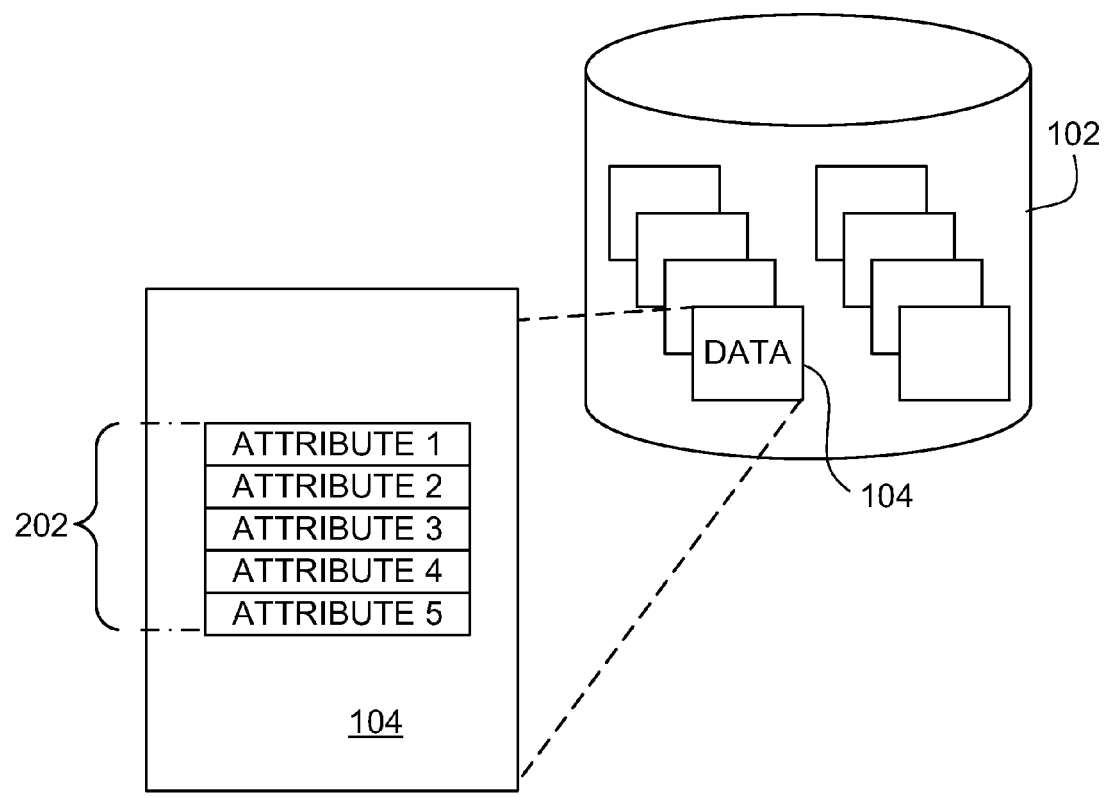
FIG. 2 illustrates a data repository for storing multi-dimensional data.

Referring to FIG. 2, the data repository 102 includes multi-dimensional data 104. Multi-dimensional data can be data that has various attributes 202 (also called fields or categories). For example, a consumer product on a web page can be represented by multi-dimensional data with attributes such as price, color, size, and model. Continuing with the "jobs" example described above, the data 104 is associated with jobs being performed on various computing systems, and the data has at least the attributes "job country" and "run status." The attributes can have one or more values. In the example of consumer products, the attribute "color" may have a value of "red," "green," or "blue," while in the "jobs" example, the attribute "run status" may have a value of "completed," "running," or "unstarted."

A system 300 for enabling a user to interact with multi-dimensional data is shown in FIG. 3. In some examples, a user 304 may wish to view a subset of the data 104 within the data repository 102 that has certain attribute values, such as a list of jobs that are both "running" and have the job country "US." After the system has grouped the data 104 into one or more subsets based on attribute values within the data, in order to return subsets of the data 104 possessing certain attribute values, the user 304 provides input 314 that indicates one or more criteria by which to process (e.g., filter) the data 104. For example, after receiving the input 314 selecting a particular subset based on the groupings displayed in the user interface, the computing device 302 applies 310 the filter to the data 104 and returns 312 a set of filtered data 308. Once received, the computing device 302 can display the filtered data 308 on a display (e.g., the display 306), store the filtered data in local or remote storage, provide the filtered data for further processing, or execute other similar operations.

Figure 4A:
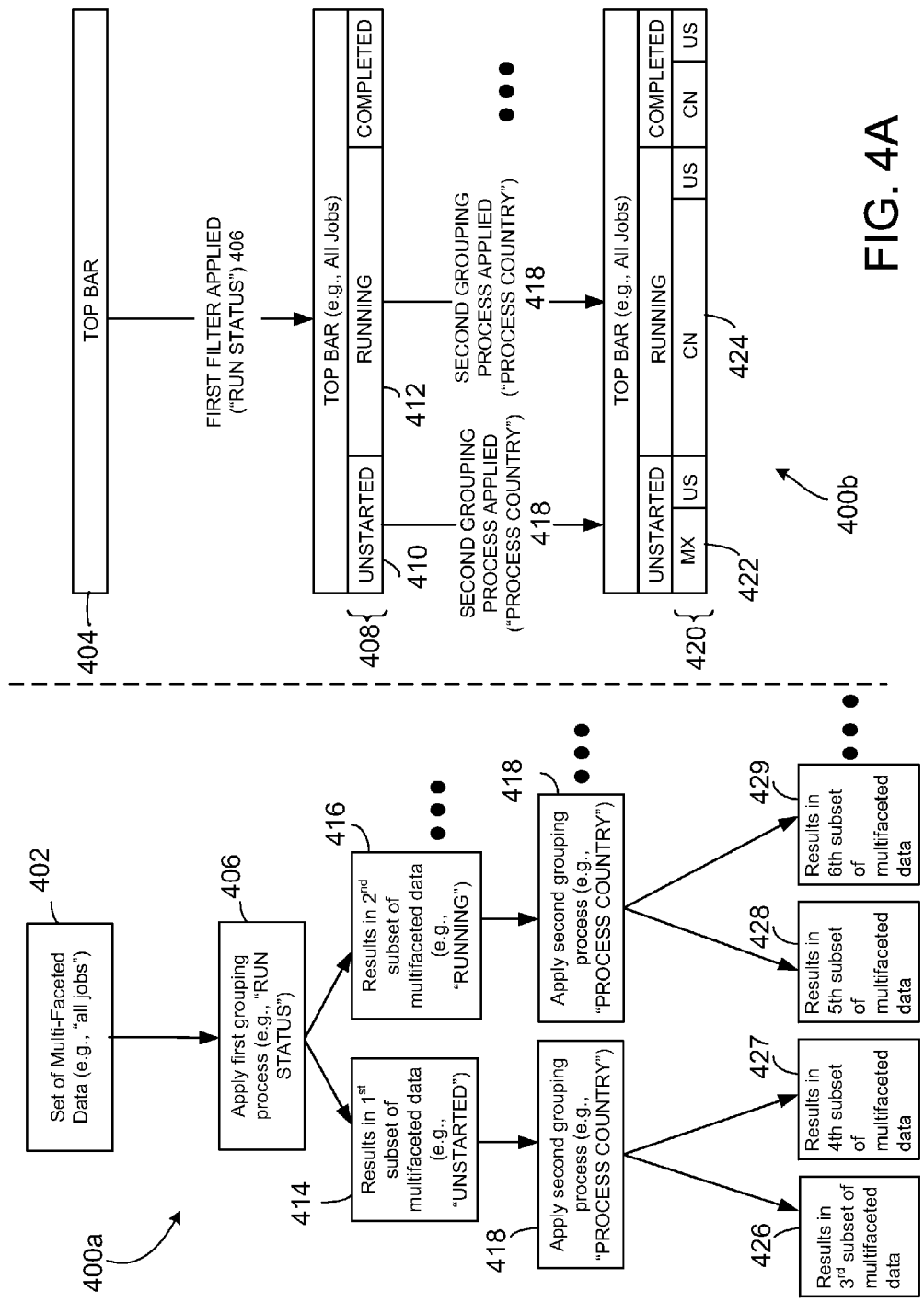
FIG. 4A illustrates operations for grouping multi-dimensional data.

FIG. 4A depicts a process flow 400a as it relates to a visual progression 400b of a graphic representation of data attributes. Together, process flow 400a and visual progression 400b depict a possible technique for grouping multi-dimensional data, which enables filtering of the multi-dimensional data based on the resulting groups. In some examples, multi-dimensional data with attributes is represented by a stack of strips that each have different sections that correspond to different groupings of the data based on values of an attribute. A set of multi-faceted data (e.g., the data representing all jobs) is provided 402, and is represented by a single strip with a single section 404. Assuming that all of the multi-dimensional data within the data repository is associated with one or more jobs, section 404 represents all of the multi-dimensional data, and also represents "all jobs" within the system.

In some examples, a user may desire to first filter all of the jobs according to the run status of each job. To that end, a first grouping is applied 406 to the data, which is represented by the addition of a strip 408 in the stack that corresponds to the "run status" attribute. Determining the sections within the strip 408 to represent respective groups of data elements may include counting numbers of data elements having a particular attribute value, as described in more detail below. Each strip within the stack (such as strip 408) is sometimes referred to as a "filter strip" since it enables filtering according to the corresponding attribute by selecting one or more sections of the filter strip. The strip 408 may have a number of possible attribute values that appear within the data elements and are used to determine the groups. For example, as the strip 408 relates to "job status," the attribute values that appear within the "job status" attribute are "unstarted," "running," and "completed." The application 406 of the grouping associated with the strip 408 results 414, 416 in the determination of multiple subsets including first and second subsets of data, which are represented by sections 410 and 412, respectively. Because an attribute can possess any number of attribute values, any number of subsets can be determined by the application of the grouping based on the values of the attribute. In this example, the "completed" subset has also been determined by the application of the first grouping.

Using section 410 as an example, the data represented by section 410 has the attribute values of: (1) data that is associated with one or more jobs; and (2) jobs that are "unstarted" (e.g., jobs that are not "running" or "completed"). Each section is also associated with the attribute values of the section(s) that are above it in the stack to which it belongs. Using section 410 as an example once again, section 410 represents only data that is associated with jobs because section 410 lies under section 404. Stated differently, each strip in the stack forms a level of a hierarchy; for example, the "all jobs" section 404 is a parent node to section 410, which can be thought of as a child node (in a tree of nodes that represents the hierarchy).

A second grouping can also be applied 418 to the data, which in turn is applied to each of the subsets 410, 412. In the example of FIG. 4A, the second grouping is applied 418 to all subsets, represented by the addition of strip 420 to the stack. In this example, the second grouping relates to the "process country" of each job, and each job has possible attribute values of Mexico (MX), United States (US), or Canada (CN). As before, application of the grouping associated with the strip 420 may result in the determination of any number of finer-grained subsets of data, but only subsets 426 and 428, and corresponding sections 422 and 424, will be discussed for simplicity. Taking section 422 as an example, section 422 represents all jobs that are both "unstarted" and that are associated with the process country Mexico. Again, this is a result of the hierarchical relationship between sections located below other sections in the stack. Similarly, section 430 represents all jobs that are both "running" and associated with the process country Canada. Any number of additional attribute strips can be included in the stack to illustrate different groupings of the data by particular attribute values that exist within the underlying data.

A user may interact with stacked representations of data attributes through a user interface to obtain additional information about the data. For example, a user could "hover" a cursor controlled by a pointing device (e.g., mouse) over a section within a stack to obtain further information about the data within the subset represented by that section. In some implementations, hovering a cursor over a section results in the display of a "pop-up" window. For example, popup window 401 (FIG. 4B) shows information for the jobs that are both issue severity "error" and "unstarted". The pop-up window could include information such as a number of jobs within that subset, as shown in FIG. 4B. In some examples, the pop-up window may also provide other information, such as the number of jobs in a subset versus the total number of jobs, an average job duration, a max job duration, an average CPU usage, and/or a max CPU usage. The window presenting the information that results from hovering a cursor over a section can also be referred to as a "tooltip" or "bubble." Any of this information could also be displayed in the sections themselves, or in other windows, tabs, or other locations within a visual workspace.

Furthermore, in some examples, a user can select (e.g., by "clicking" a mouse when a cursor is in a particular position within a graphical display) multiple sections or strips for which to display more information or apply a filter to generate a list of data elements having particular attribute values. For example, in FIG. 4A, if a user selects sections 422 and 424 (which may result in those sections being highlighted, shaded, or otherwise distinguished from the non-selected sections), a list could be generated consisting of jobs that are "unstarted" in Mexico along with jobs that are "running" in Canada. Similarly, selecting the "unstarted" section 410 alone would provide a list of all unstarted jobs, regardless of their associated process countries. For example, selecting the "unstarted" section 410 could provide a list of all jobs that are unstarted in Mexico along with all jobs that are unstarted in the United States, as those subsets together correspond to all the sections that are below the "unstarted" section 410.

Multiple attribute values can be grouped together and used to define a single section for which a filter will be applied (in response to user selection). For example, the "run status" section may be defined to include "unstarted" as a possible value, where "unstarted" can include both jobs that have not yet reached their scheduled start time, and jobs that have reached their scheduled start time but are waiting for some other process to complete (e.g., jobs that are waiting for a file to appear or jobs that are waiting for a resource to become available). Similarly, the "completed" value can include both those jobs that have been run and failed, and jobs that have been run and succeeded.

In some examples, graphical features of the stacked representation of data attributes can identify characteristics of the underlying data. For example, the width of a particular section (such as section 424) can indicate the proportion of data having a particular attribute value relative to the entire set of data associated with the section above it. As shown in FIG. 4A, the width of section 424 is greater than the width of section 432. This can indicate, for example, that there are more jobs that are "running" in Canada than there are jobs that are "running" in the United States. Similarly, the amount of jobs that are "running" is larger than the amount of "unstarted" jobs, as shown by the difference between the widths of sections 410 and 412.

Referring to FIG. 5, in some situations, a single section might represent a large number of subsets of a lower level attribute that each correspond to relatively small amounts of data. For example, the "run status" section 510 defined by the heading "unstarted" encompasses a number of lower level "process country" subsets represented by section 504 ("MX") as well as a number of other sections. In order to preserve the proportionality illustrated by the width of each section, a plurality of subset sections can be grouped into one or more "bucket" sections (e.g., bucket section 502) that can be expanded to reveal their contents. This approach allows a user to observe the amount of data in lower level section 504 relative to total amount of data within higher level section 510. In the example of FIG. 5, comparatively, section 504 contains proportionally more data than is contained in section 502. In order to view the contents of section 502, a user may hover or click a cursor 508 on the bucket section 502, which creates an expanded view of that section's contents. The expanded view can include devices for browsing the contents of the bucket section 502, such as a horizontal scroll bar 506 or other devices. Selecting one or more sections (e.g., section 512) within the expanded view can have effects that are similar to those described above with regard to the selection of a non-bucket section (e.g., displaying jobs within the subset of data represented by that section, etc.).

Figure 6:
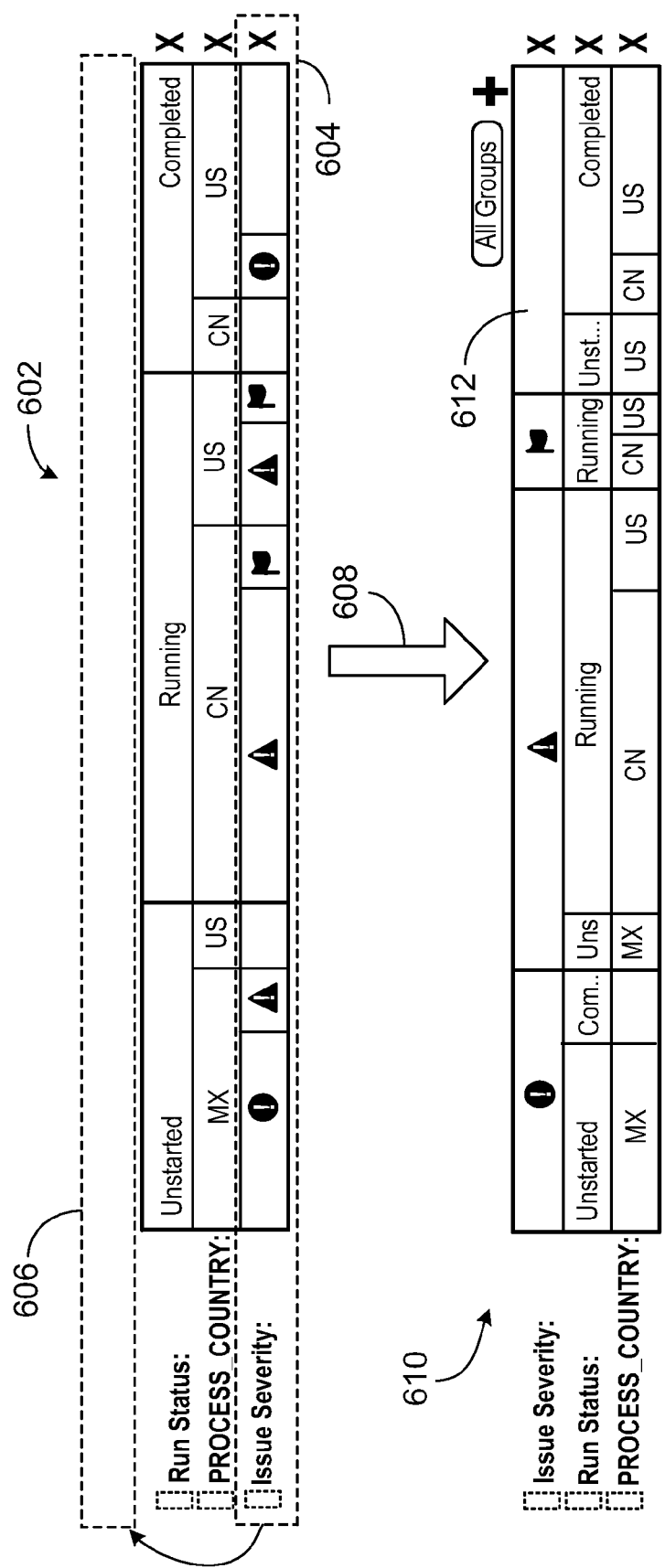
FIG. 6 illustrates the dynamic modification of filter strips.

Groupings can be dynamically applied to sets of data. FIG. 6 illustrates an example in which a user can alter the order in which the groupings are applied to data by interacting with the stacked representation of the data. For example, stack 602 contains three strips with the headings run status, process country, and issue severity. These strips represent three different attributes of a set of data (in this case, the data is a set of jobs). Due to the hierarchical relationship between sections discussed above, the order in which groupings are applied follows from the topmost strip to the bottommost strip (e.g., run status→process_country→issue severity). For example, if a user desired to change the order in which the groupings were applied (that is, if the user desired to alter the hierarchy) such that the "issue severity" grouping would be applied first, a user could use a cursor to select the bottommost strip 604 ("issue severity") and could drag the strip to a position (highlighted by dashed-line box 606) at the top of the stack.

In the example of FIG. 6, dragging the issue severity strip (highlighted with dashed-line box 604) to the top of the stack has resulted 608 in the dynamic modification of the stack 602. As shown in updated stack 610, data is now grouped first according to issue severity, then by run status, and then by process_country. This dynamic updating of stacked representation can occur in real time, and can result in the creation of new sections. For example, the dynamic modification depicted in FIG. 6 resulted in the creation of a new section 612, as the "issue severity" grouping is associated with more attribute values (four) than the "run status" grouping (three). Adding or deleting strips from the stack 602 can also cause the stack 602 to be dynamically modified or updated in a similar fashion.

FIG. 7 shows an exemplary interface 700 that can be used to apply filters to a data set using a combination of filter strips and other user interface elements (e.g., menus and lists). The interface 700 includes a menu 702 (e.g., a drop-down menu) by which a user can apply a selected filter to a data set consisting of "All Jobs," as indicated by label 701. Menu 702 indicates that the attribute "run status" is being used to filter the data set. The attribute values 706 appearing within the data for the attribute "run status" are "unstarted," "running," and "completed," which are displayed in an attribute value viewing pane 704. Selecting between different attribute values 706 within attribute value viewing pane 704 filters the jobs that appear in the job list 712. In the example of FIG. 7, the "all" selection has been chosen, so the jobs that appear in the job list 712 are not being filtered by a particular attribute value related to the run status of a job. The job list 712 provides further detail about each displayed job. For example, the job list 712 provides the actual start time of each job (where applicable), as well as the process country and other information.

Filters can also be applied to the jobs using filter strips, using similar techniques to those described above. For example, filter strip 710 is being applied to the data set in conjunction with the "run status" filter applied by the menu 702, although in this particular example, because all process countries are selected (e.g., CN, MX, US, and Other) filter strip 710 may not further filter the jobs listed in job list 712. As in previous examples, the sections within filter strip 710 each have a width that proportionally reflects the amount of data within a particular section vis-à-vis the entire data set, or some portion thereof. Therefore a filter strip with all sections selected may still provide useful information about the groupings represented by different sections, even if no filtering is being performed. In the example of FIG. 7, the filter strip 710 indicates that there are a greater number of jobs with the process country Canada (CN) than jobs with the process country Mexico (MX). Additional filter strips can be added to the interface 700 and applied to the data set using a number of techniques, such as activating an "add" button 708. Similarly, filter strips can be removed from the interface 700 by activating a "delete" button 714. Filter strips can also be dragged into the interface 700 from other programs, tabs, or other locations, or can be selected from a drop-down menu similar to menu 702.

Figure 8:
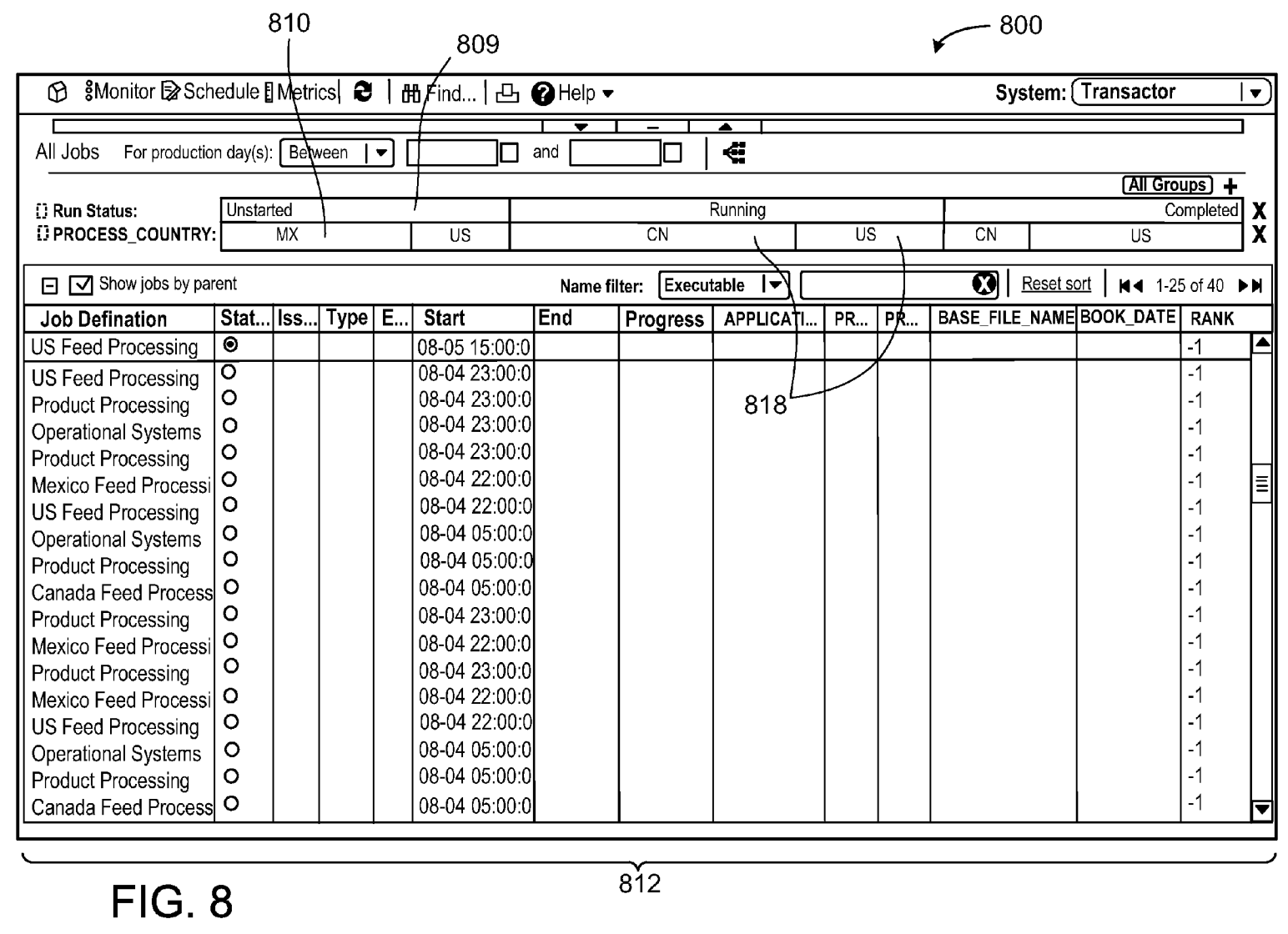

FIG. 8 shows an example of an interface 800 that can be used to apply filters to a data set. Filter strip 809 can be used to filter the data set based on the attribute "run status." As shown in FIG. 8, multiple filter strips can be applied to a data set within interface 800 using previously-described techniques. As in the example of FIG. 6, the filter strips 809, 810 can function as dynamically adjustable filtering stages. For instance, if a user changes the order in which the filter strips are applied to the data set by dragging filter strip 810 to a position above filter strip 809, the hierarchy among the jobs represented by the interface 800 can be dynamically modified, as well as the arrangement of the respective sections within filter strips 809, 810 according to the modified hierarchy. Due to the selection of particular sections 818 within filter strip 810, the job list 812 displays jobs that are running with a process country of Canada, along with jobs that are running with a process country of US. The job list 812 displays additional information related to the displayed jobs.

Figure 9A:
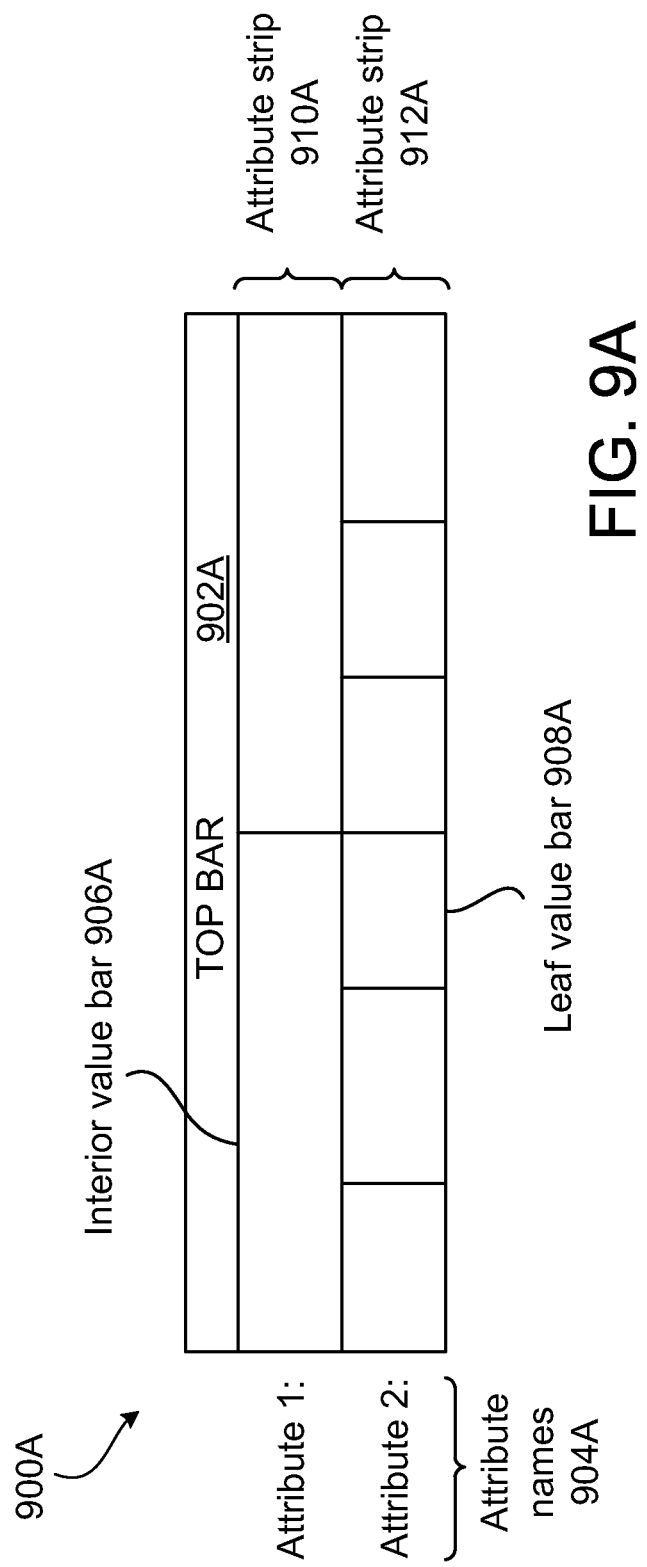
FIGS. 9A-10G illustrate possible systems for grouping attributes of data.

In some examples, filter strips may also be referred to as "attribute strips," such as the attribute strips 910A, 912A shown in the stack or "graphical data selector" 900A depicted in FIG. 9A. The attribute strips 910A, 912A provide the same features as those described above with regard to filter strips, such as providing tools for the organization, selection, and grouping of data. Within the graphical data selector 900A, the attribute strips 910A, 912A can include sections called "interior value bars" (e.g., the interior value bar 906A) and sections called "leaf value bars" (e.g., the leaf value bar 908A). In all examples, values represented within an attribute strip partake in the qualities of the attribute strip(s) above that attribute strip. For example, the leaf value bar 908A represents a subset of the data represented by the interior value bar 906A, while all of the value bars within either of the attribute strips 910A, 912A are subsets of the data represented by the "top bar" 902A. In some examples, the top bar 902A represents an entire data set. The attribute strips 910A, 912A are each identified by an attribute name 904A (e.g., Attribute 1 and Attribute 2). Attribute strips, like the filter strips discussed above, allow for the investigation and presentation of the attributes of data within a dataset.

Figure 9B:
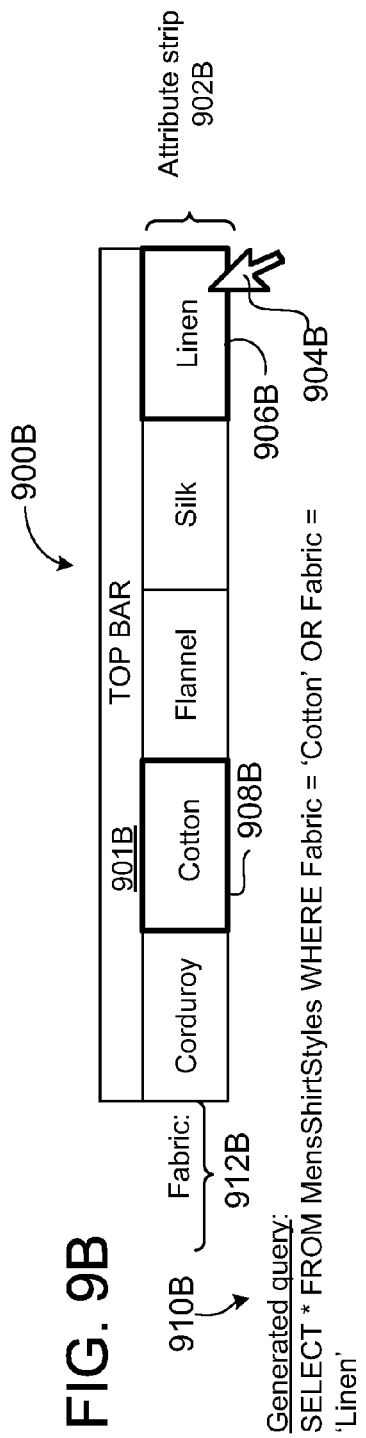

FIG. 9B shows a graphical data selector 900B that includes an attribute strip 902B. As described above, the graphical data selector 900B and its corresponding attribute strips (i.e., the attribute strip 902B) can be used to select some or all of the data represented by the graphical data selector 900B. In this example, a user has selected (e.g., using the cursor 904B) a linen leaf value bar 906B and a cotton leaf value bar 908B (e.g., by holding down the control key while making selections with the cursor 904B), resulting in the selection of a subset of the men's shirt styles dataset represented by the top bar 901B. The attribute name 912B ("fabric") indicates that the attribute strip 902B represents various fabrics in which men's shirts are available. As described above, selecting one or more groups of data (e.g., leaf value bars or interior value bars, sometimes referred to as sections) can result in the generation of a query 910B, such as a query that can be used to retrieve the data represented by the selected groups. In this example, selection of the cotton leaf value bar 908B and the linen leaf value bar 906B results in the generation of the query: SELECT*FROM MensShirtStyles WHERE Fabric='Cotton' OR Fabric='Linen'. As shown in the query, this selection retrieves data having the fabric attribute value cotton as well as data having the fabric attribute value linen. Data is filtered upon the selection of one or more sections within the graphical data selector 900B; that is, the arrangement of the attribute strips within the graphical data selector 900B controls the groupings of data, while the selection of one or more groups within the graphical data selector 900B generates a query to retrieve the data that is associated with the selected groups. Deselecting a section can adjust the query (e.g., by removing parameters from the query associated with the deselected section).

Figure 9C:
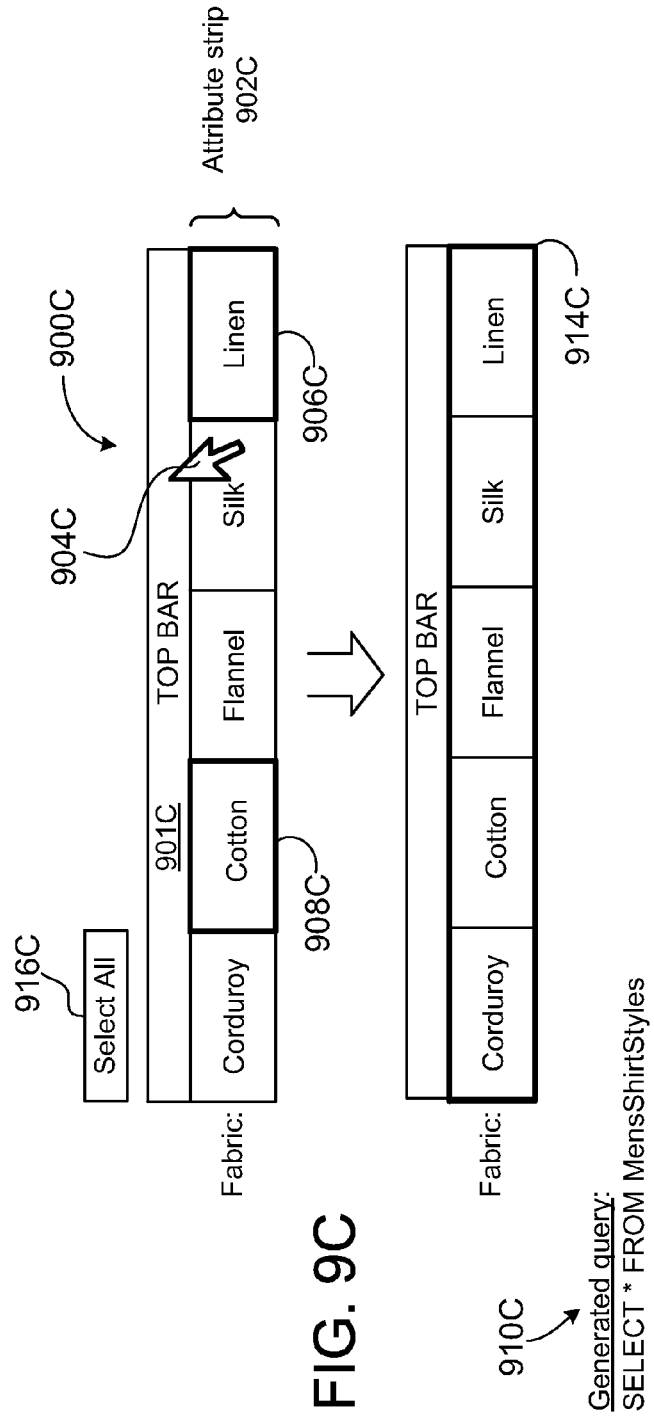

FIG. 9C shows an example selection mechanism that can be used to select groups within the graphical data selector 900C. For example, selecting a top bar 901C (e.g., using the cursor 904C) or selecting the select all control 916C may, by default, cause all of the groups nested beneath the top bar (e.g., all the groups associated with the attribute strip 902C) to be selected. As shown, before the top bar 901C is selected, the leaf value nodes 906C and 908C are selected, while after the top bar 901C is selected, all the groups within the attribute strip 902C are selected (as shown by the emphasized region 914C). As above, selection of the emphasized region 914C (which includes all five leaf value bars associated with the attribute strip 902C) may generate a query 910C: SELECT*FROM MensShirtStyles. In this example, the emphasized region 914C (and its corresponding query) represents all of the data in the data set MensShirtStyles. Similarly, referring back to FIG. 9A, selection of the interior value bar 906A can cause the selection of all of the groups with which it is associated (e.g., the leaf value bars located directly underneath, or anywhere underneath, the selected interior value bar 906A).

Figure 10A:
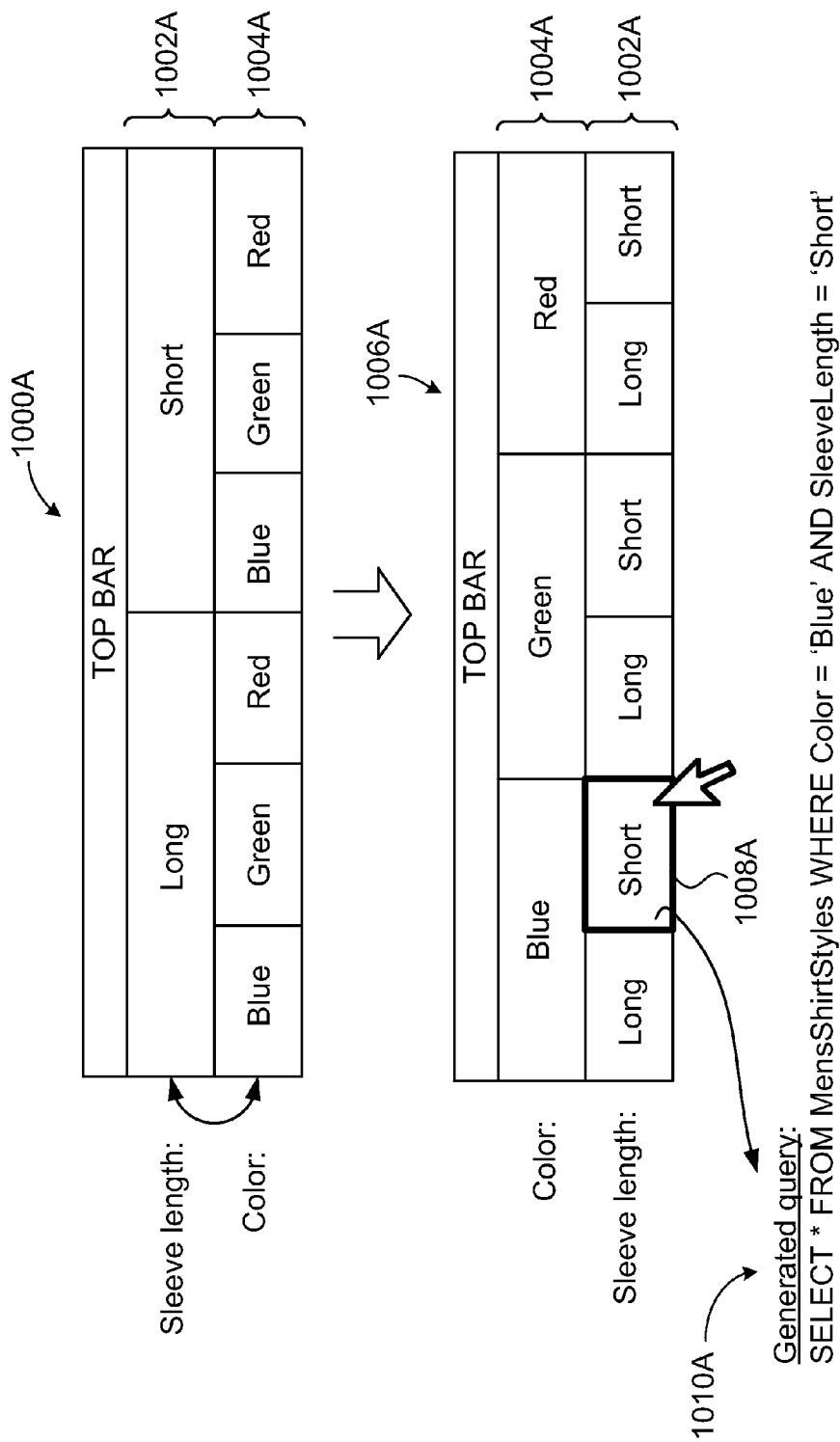

FIG. 10A shows a first instance of a graphical data selector 1000A that includes attribute strips 1002A, 1004A. In the first instance of a graphical data selector 1000A, groups are formed which are primarily based on a sleeve length of a shirt and are secondarily grouped based on a color of a shirt. However, as described above, attribute strips can be reorganized (e.g., by dragging and dropping the attribute strips, or by activating an arrangement control such as those shown in FIGS. 10E and 10F) so that new groupings of data will be generated. In this way, the focus of the graphical data selector 1000A can be altered. For example, a second instance of a graphical data selector 1006A results if the arrangement of attribute strips is altered by positioning the attribute strip 1004A above the attribute strip 1002A. In the second instance of the graphical data selector 1006A, groups are formed which are primarily based on a color of a shirt and are secondarily based on a sleeve length of a shirt.

Selecting the short leaf value bar 1008A can generate a query 1010A that can be used to identify and retrieve data. In this example, the query 1010A is: SELECT*FROM MensShirtStyles WHERE Color='Blue' AND SleeveLength='Short'. Submission of the query 1010A can allow a record system to identify data that is associated with blue shirts that are short-sleeved.

Figure 10B:
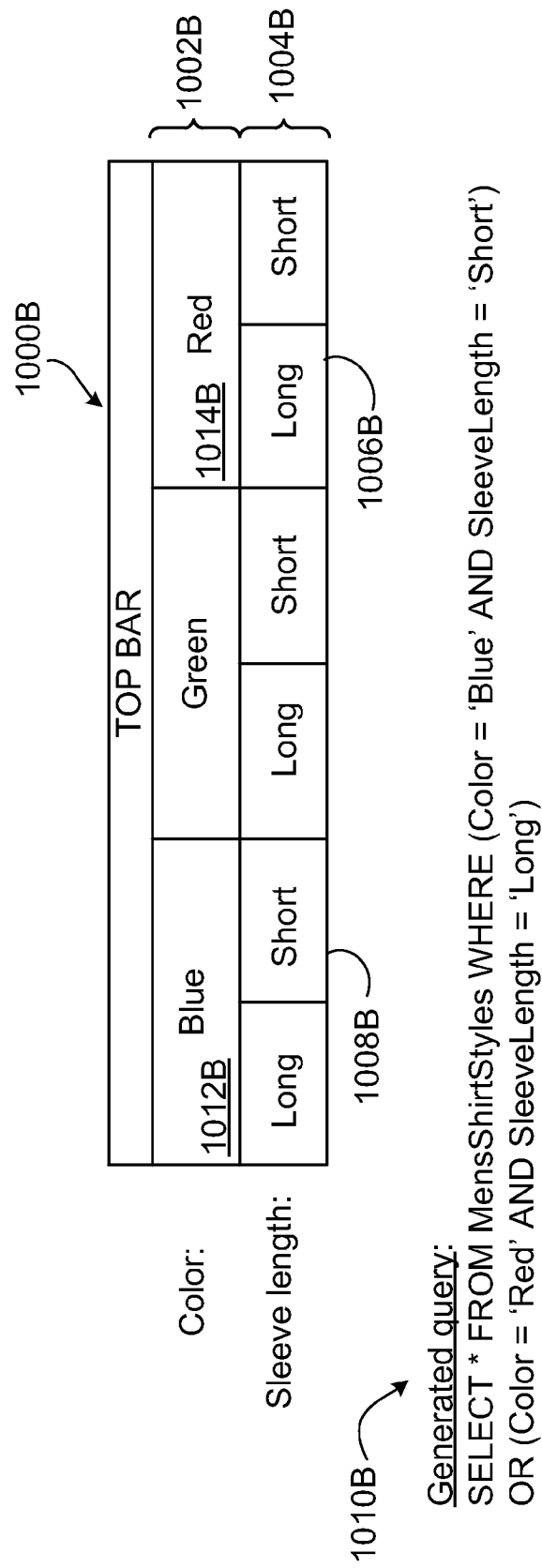

FIG. 10B shows a graphical data selector 1000B that includes attribute strips 1002B, 1004B. In this example, a short leaf value bar 1008B and a long leaf value bar 1006B have been selected within the attribute strip 1004B. Selecting the short leaf value bar 1008B and the long leaf value bar 1006B can cause a query 1010B to be generated. The query 1010B is: SELECT*FROM MensShirtStyles WHERE (Color='Blue' AND SleeveLength='Short') OR (Color='Red' AND SleeveLength='Long'). Because leaf value bars are selected that are associated with different interior value bars 1012B, 1014B, the query 1010B can identify and retrieve data that is associated with shirts that are both blue and short-sleeved, as well as shirts that are red and long-sleeved.

FIG. 10C shows a graphical data selector 1000C that includes attribute strips 1002C, 1004C. In this example, a green interior value bar 1005C has been selected (e.g., using the cursor 1006C). As described above, the selection of an interior value bar may cause groups located directly underneath, or anywhere underneath, the selected interior value bar 1005C to be selected. In this example, selection of the interior value bar 1005C causes the selection of a cluster 1008C that includes the long leaf value bar 1012C and the short leaf value bar 1014C. Selection of the cluster 1008C causes the generation of a query 1010C, which is: SELECT*FROM MensShirtStyles WHERE Color='Green' AND (SleeveLength='Long' OR SleeveLength='Short'). This query can be used to identify and retrieve data that is associated with green shirts that have long sleeves as well as green shirts that have short sleeves. In this example, the query 1010C would identify and retrieve data identical to the query: SELECT*FROM MensShirtStyles WHERE Color='Green' (i.e., all green shirts).

Figure 10D:
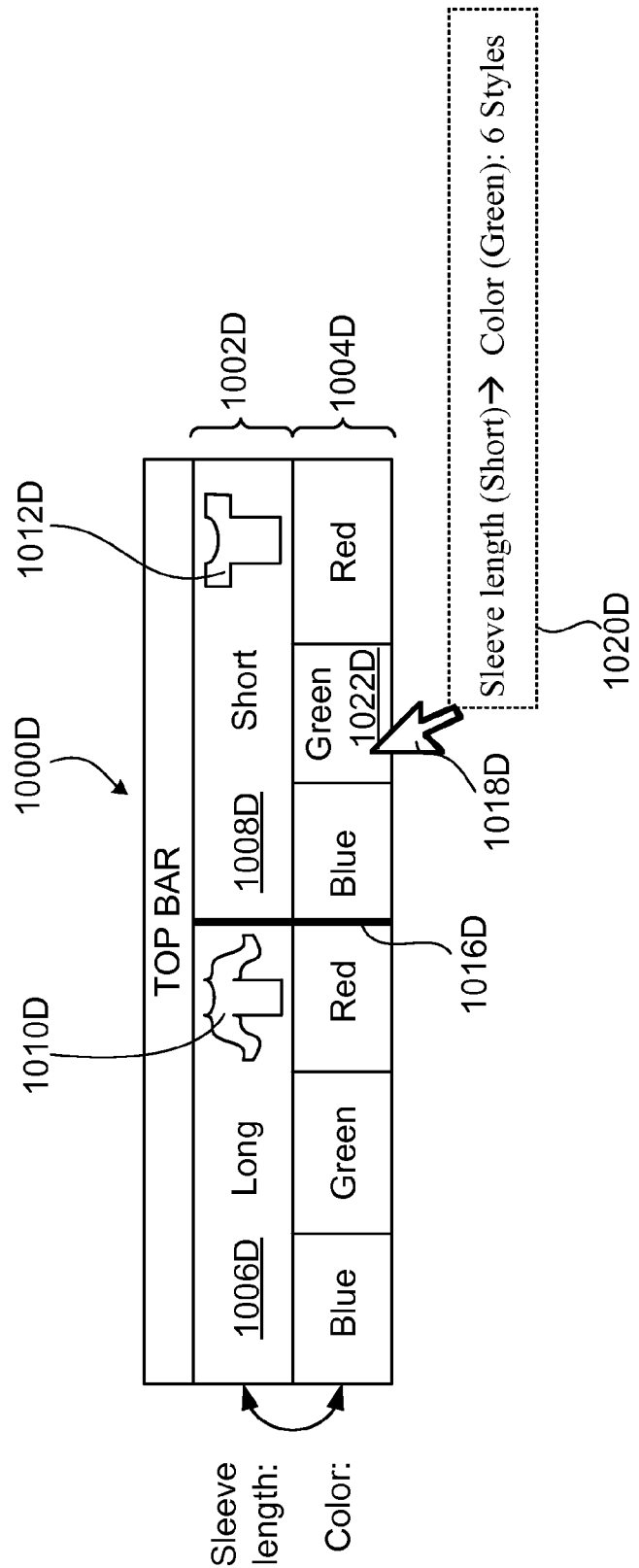

FIG. 10D shows a graphical data selector 1000D that includes attribute strips 1002D, 1004D. The graphical data selector 1000D includes several visual enhancements that can be applied to any of the examples discussed herein. For example, a given group within the graphical data selector 1000D may include one or more symbols that represent attribute values of the group in which the one or more symbols are located. In this example, the long interior value bar 1006D includes an image 1010D that represents a long-sleeved shirt, while the short interior value bar 1008D includes an image 1012D that represents a short-sleeved shirt. The images 1010D, 1012D may allow a user to more quickly identify the attribute values that a given group represents. The graphical data selector 1000D may also include enhanced delineations, such as 1016D. In some examples, enhanced delineations may make bold (or otherwise emphasized) vertical lines within the graphical data selector 1000D that begin outside but cross into leaf value bars (e.g., the groups at the bottom of the graphical data selector 1000D). These enhanced delineations may increase the visual prominence of the different "paths" through the data (e.g., when traversing the graphical data selector 1000D from top to bottom).

In some examples, the graphical data selector 1000D may also provide enhanced information about a given value bar. For example, if a user hovers a cursor 1018D over a group (e.g., a green leaf value bar 1022D), information about the group can be provided to the user in the form of an information box 1020D. The information box 1020D may appear after the cursor 1018D has been hovering over a given group for a predetermined amount of time (e.g., two or more seconds). The information box 1020D (or the information provided therein) does not necessarily need to be arranged near the cursor 1018D, and may appear or be recorded in other locations and positions.

Figure 10E:
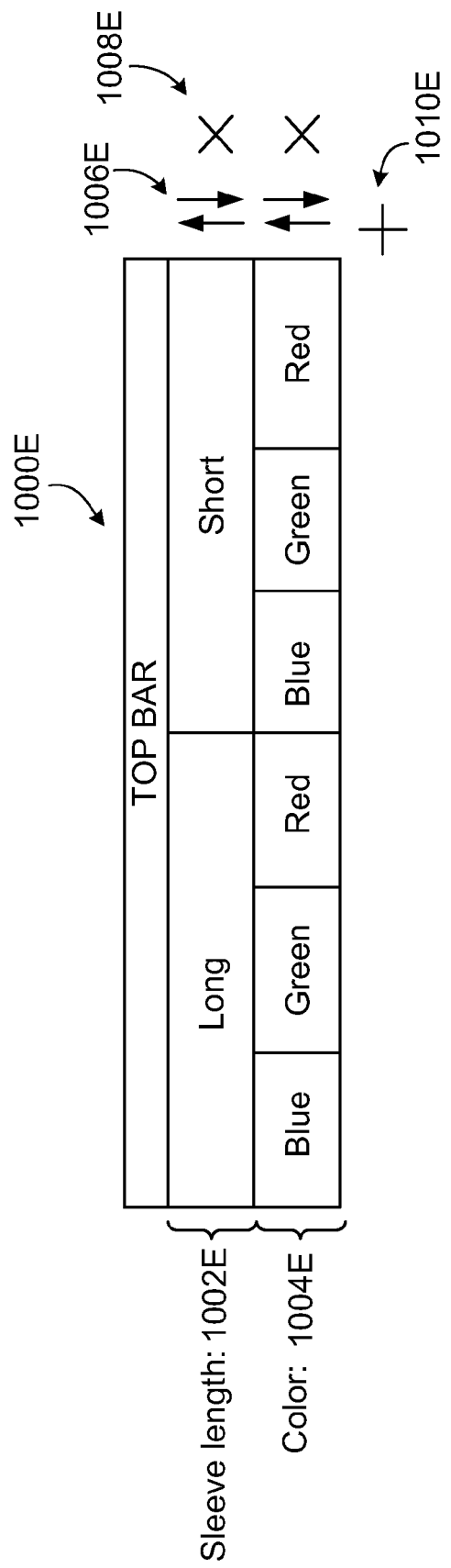

FIG. 10E shows a graphical data selector 1000E that includes attribute strips 1002E, 1004E. The graphical data selector 1000E includes several arrangement controls that can be applied to any of the examples discussed herein. For example, the graphical data selector 1000E includes an ordering control 1006E that, when activated, can cause an attribute strip to shift up or down within the graphical data selector 1000E. For example, activating the "down arrow" associated with the ordering control 1006E can cause the attribute strip 1002E to shift down one position within the graphical data selector 1000E (e.g., such that the attribute strip 1004E would then occupy the first position within the graphical data selector 1000E and the attribute strip 1002E would occupy the second position within the graphical data selector 1000E).

The graphical data selector 1000E may also include a deletion control 1008E and an addition control 1010E that, when activated, can cause an attribute strip to be removed from, or added to, the graphical data selector 1000E, respectively. Adding or removing an attribute strip may cause the graphical data selector 1000E to automatically determine new groups and the values associated therewith.

Figure 10F:
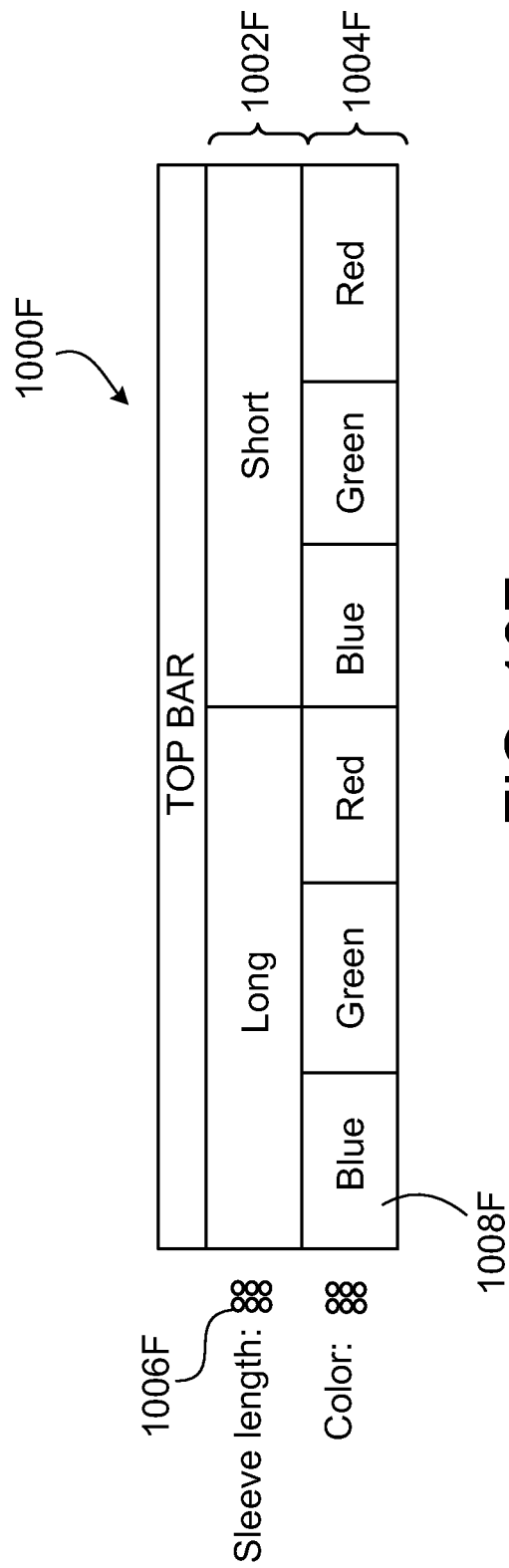

FIG. 10F shows a graphical data selector 1000F that includes attribute strips 1002F, 1004F. The graphical data selector 1000F includes several arrangement controls that can be applied to any of the examples discussed herein. For example, the graphical data selector 1000F includes a drag-and-drop ordering control 1006F that, when dragged and dropped, can cause an attribute strip to shift up or down within the graphical data selector 1000F. For example, the drag-and-drop ordering control 1006F associated with the attribute strip 1002F may be used to move the attribute strip 1002F down one position within the graphical data selector 1000F (e.g., such that the attribute strip 1004F would then occupy the first position within the graphical data selector 1000F and the attribute strip 1002F would occupy the second position within the graphical data selector 1000F).

In any of the examples described above, sections, groups, and/or value bars might only be generated and presented for attribute values that exist. For example, empty groups might not be represented within a filter strip or an attribute strip. This arrangement is in contrast to fixed taxonomy techniques which require the static display of data groups (e.g., one for each possible value of the attribute) regardless of whether any data objects having that group's attribute value actually exists in the data. Excluding empty sets from presentation in combination with filter strips or attribute strips may advantageously prevents users from generating queries that yield no results.

In some examples, any of the data arrangements described above (e.g., filter strips and/or attribute strips) can respond dynamically to the introduction or removal of data into a data set. Using FIG. 10F as an example, if all data associated with blue long-sleeved shirts were removed from the data set, the blue leaf value bar 1008F could be removed from the attribute strip 1004F, and the other leaf value bars could be resized accordingly (e.g., according to their respective proportions, as described above). The introduction of new data into a data set may also cause entirely new value bars to be added to a graphical data selector. For example, if new data is introduced that includes an attribute value not represented within the attribute strip 1004F, a new value bar may appear in that attribute strip.

Figure 10G:
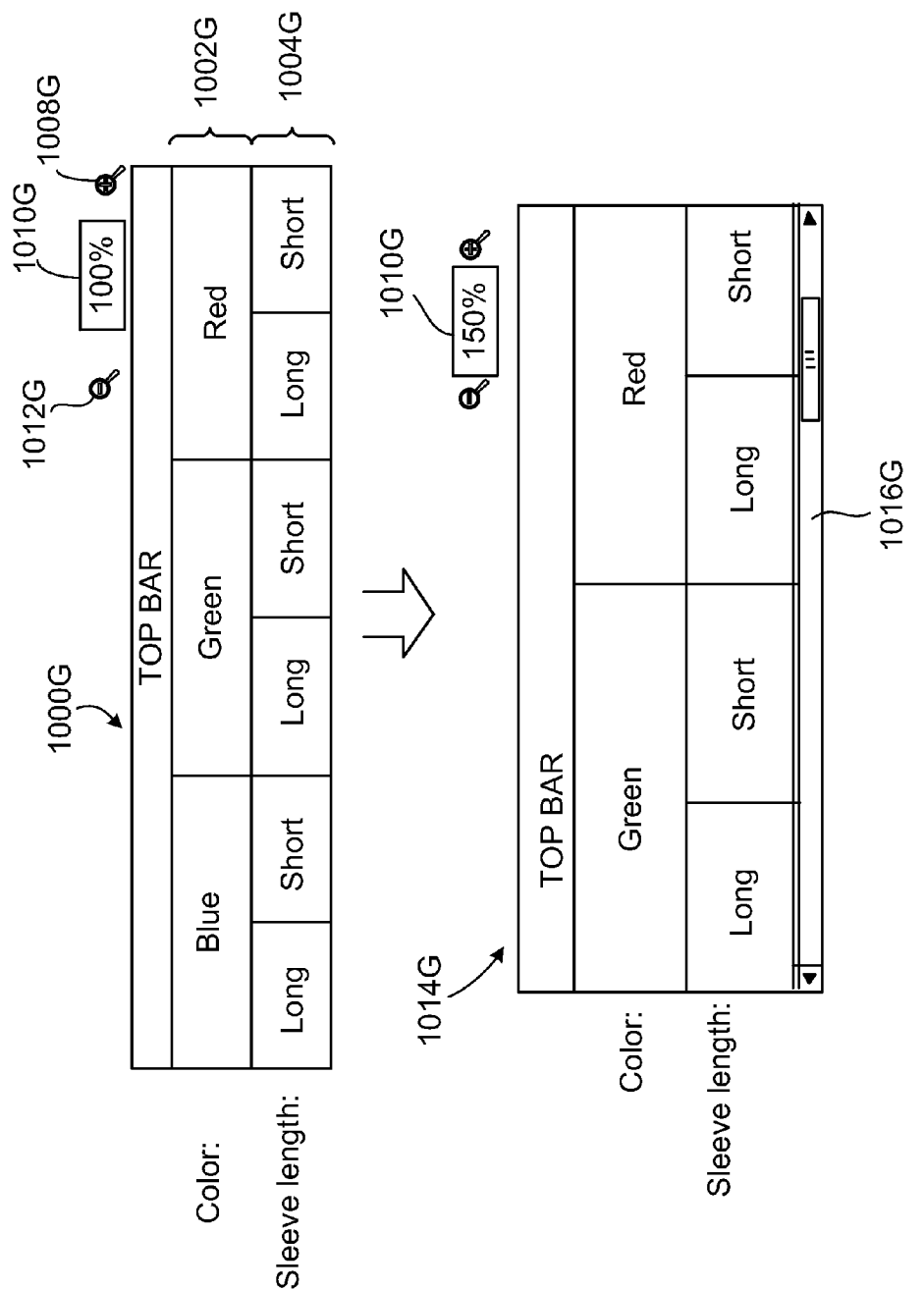

FIG. 10G shows a graphical data selector 1000G that includes attribute strips 1002G, 1004G. The graphical data selector 1000G also includes controls that allow a user to control the zoom level associated with the graphical data selector 1000G. For example, the graphical data selector includes a zoom in control 1008G, a zoom out control 1012G, and a zoom level indicator 1010G (e.g., showing a zoom level of 100%). Users may adjust the zoom level of the graphical data selector 1000G by activating the zoom in control 1008G and the zoom out control 1012G, or by entering a numerical zoom level in the zoom level indicator 1010G. In this example, the zoom level has been changed to 150% (as shown in a second state of the zoom level indicator 1010G), which has resulted in a zoomed view 1014G of the graphical data selector 1000G. Activation of a scroll control 1016G may allow users to scroll horizontally (or vertically, depending on the zoom level) in order to bring desired aspects of the graphical data selector 1000G into view. Zoom features may allow users to view particular portions of the graphical data selector 1000G with greater precision (e.g., when a particular attribute strip includes a large number of cells that would be displayed as many small cells in an unzoomed view of the graphical data selector 1000G).

Figure 11:
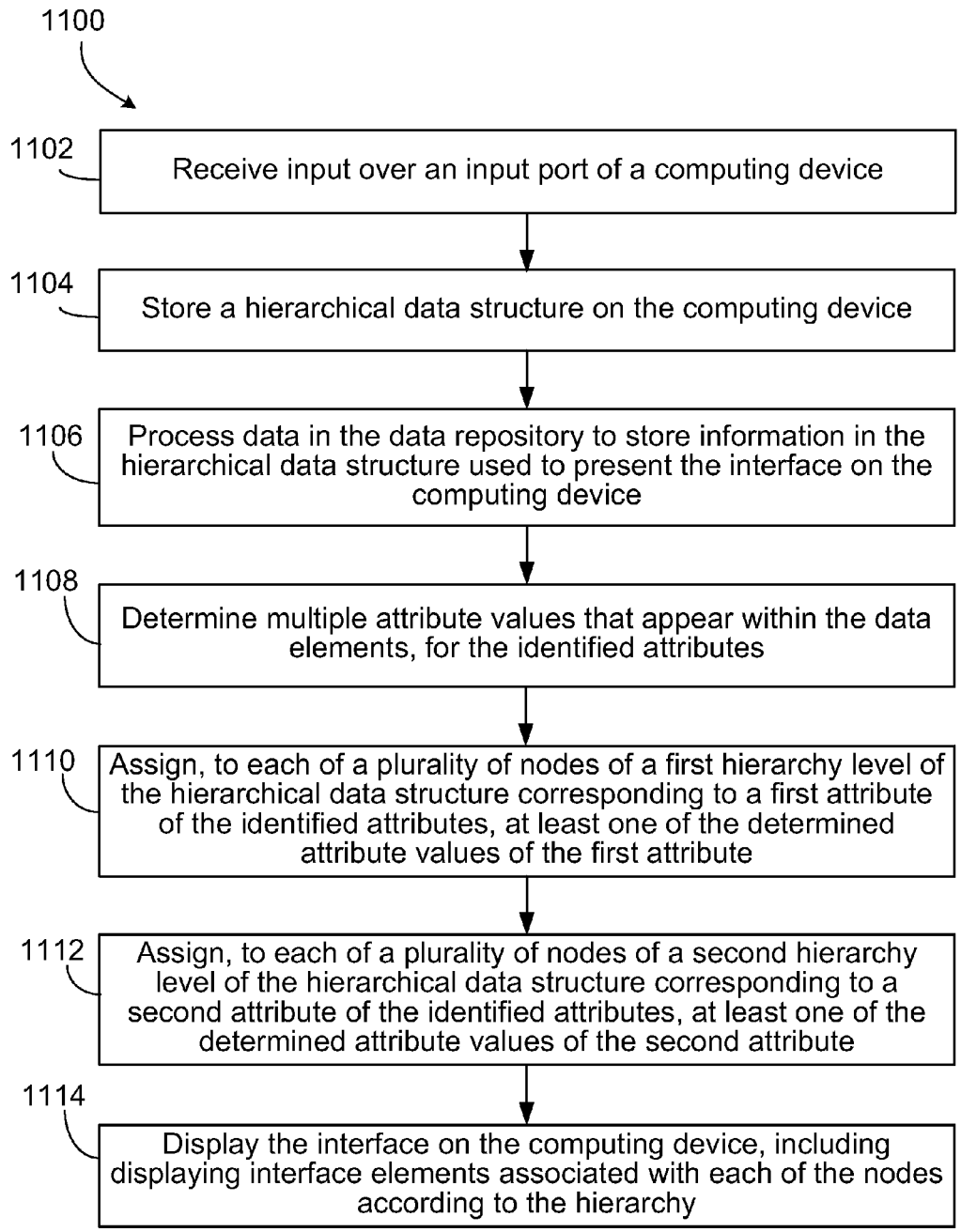
FIG. 11 is a flow chart of operations for grouping data.

FIG. 11 shows a flowchart 1100 that describes a process for providing an interface on a computing device used for interacting with multi-dimensional data stored in a data repository. Input is received over an input port of a computing device (1102). In some examples, the put includes information identifying two or more attributes of data elements stored in the data repository, and information indicating an order for the identified attributes. An hierarchical data structure is stored on a computing device (1104). In some examples, the hierarchical data structure includes a hierarchy having a plurality of hierarchy levels that each correspond to one of the identified attributes, with an order of the hierarchy levels corresponding to the indicated order for the identified attributes.

Data in the data repository is processed to store information in the hierarchical data structure used to present the interface on the computing device (1106). Multiple attribute values are determined that appear within the data elements, for the identified attributes (1108).

At least one of the determined attribute values of the first attribute is assigned to each of a plurality of nodes of a first hierarchy level of the hierarchical data structure corresponding to a first attribute of the identified attributes (1110). At least one of the determined attribute values of the second attribute is assigned to each of a plurality of nodes of a second hierarchy level of the hierarchical data structure corresponding to a second attribute of the identified attributes (1112). In some examples, each of the plurality of nodes of the second hierarchy level are also assigned respective ones of the determined attribute values assigned to one or more nodes of preceding hierarchy levels, according to the order of the hierarchy levels, for the corresponding attributes. The interface is displayed on the computing device, including displaying interface elements associated with each of the nodes according to the hierarchy (1114).

The techniques described above offer a number of advantages. For example, all "paths" through an arrangement of data can be made visible at the same time (e.g., a graphical data selector can shows all possible combinations of attribute values that exist in the data for the attributes included in the graphical data selector). Furthermore, multiple distinct subsets of the data can be selected at the same time (e.g., leaf value bars of more than one path may be selected at the same time). Complex queries can be easily generated without, for example, a user needing to provide AND and OR logical operators. Additionally, when proportional display of value bars is used, the information about quantities and combinations can be made visible regardless of whether a query is generated.

The techniques for filtering data described above can be implemented using software for execution on a computing device. For instance, the software forms procedures in one or more computer programs that execute on one or more programmed or programmable computer systems (which may be of various architectures such as distributed, client/server, or grid) each including at least one processor, at least one data storage system (including volatile and non-volatile memory and/or storage elements), at least one input device or port, and at least one output device or port. The software may form one or more modules of a larger program, for example, that provides other services related to the design and configuration of computation graphs. The nodes and elements of the graph can be implemented as data structures stored in a computer readable medium or other organized data conforming to a data model stored in a data repository.

The software may be provided on a storage medium, such as a CD-ROM, readable by a general or special purpose programmable computer or delivered (encoded in a propagated signal) over a communication medium of a network to a storage medium of the computer where it is executed. All of the functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the invention have been described. Nevertheless, it will be understood that various modifications may be made without departing from the spirit and scope of the invention. For example, some of the steps described above may be order independent, and thus can be performed in an order different from that described.

It is to be understood that the foregoing description is intended to illustrate and not to limit the scope of the invention, which is defined by the scope of the appended claims. For example, a number of the function steps described above may be performed in a different order without substantially affecting overall processing. Other embodiments are within the scope of the following claims.

What is claimed is:

1. A method for providing an interface on a computing device for interacting with multi-dimensional data stored in a data repository, the method including:

receiving, over an input port of the computing device, input including information identifying two or more attributes of data elements stored in the data repository; and information indicating an order for the identified attributes, in which the two or more attributes include a first attribute and a second attribute, each of the first and second attributes has two or more attribute values;

storing on the computing device a hierarchical data structure, the hierarchical data structure including a hierarchy having a plurality of hierarchy levels that each corresponds to one of the identified attributes, with an order of the hierarchy levels corresponding to the indicated order for the identified attributes, and the first attribute is associated with a hierarchy level higher than the hierarchy level associated with the second attribute;

processing data in the data repository to store information in the hierarchical data structure used to present the interface on the computing device, the processing including determining multiple attribute values that appear within the data elements, for the identified attributes, assigning, to each of a plurality of nodes of a first hierarchy level of the hierarchical data structure corresponding to the first attribute, at least one of the determined attribute values of the first attribute, in which a first node is assigned a first attribute value of the first attribute and a second node is assigned a second attribute value of the first attribute, and assigning, to each of a plurality of nodes of a second hierarchy level of the hierarchical data structure corresponding to the second attribute, at least one of the determined attribute values of the second attribute, each of the plurality of nodes of the second hierarchy level also being assigned respective ones of the determined attribute values assigned to one or more nodes of preceding hierarchy levels, according to the order of the hierarchy levels, for the corresponding attributes, in which a third node is assigned the first attribute value of the first attribute and a first attribute value of the second attribute, a fourth node is assigned the first attribute value of the first attribute and a second attribute value of the second attribute, a fifth node is assigned the second attribute value of the first attribute and a first attribute value of the second attribute, and a sixth node is assigned the second attribute value of the first attribute and the second attribute value of the second attribute; and displaying the interface on the computing device, including displaying graphical interface elements associated with each of the nodes according to the hierarchy.

2. The method of claim 1, further including generating a query in response to receiving input that includes a selection of one or more of the nodes of the data structure, each node representing data elements with the combination of attribute values assigned to that node in the hierarchy, with a set of data elements returned by the query corresponding to the union of the data elements represented by each of the individual nodes.

3. The method of claim 1, further including assigning, to each of a plurality of nodes of each successive hierarchy level of the hierarchical data structure corresponding to respective attributes of the identified attributes, at least one of the determined attribute values of the respective attribute, each of the plurality of nodes of each successive hierarchy level also being assigned respective ones of the determined attribute values assigned to all nodes of preceding hierarchy levels, according to the order of the hierarchy levels, for the corresponding attributes.

4. A method for providing an interface on a computing device for interacting with multi-dimensional data stored in a data repository, the method including:

storing on the computing device an organizational data structure;

processing data in the data repository to store information in the organizational data structure used to present the interface on the computing device, the processing including determining at least a first attribute of a plurality of attributes of data elements stored in the data repository, determining multiple attribute values of the first attribute that appear within the data elements, determining, for each particular attribute value of the multiple attribute values, a numeric value representing how many data elements in a respective subset of data elements include the particular attribute value, assigning, to each of a plurality of nodes of a first hierarchy level of the organizational data structure corresponding to the first attribute, at least one of the determined attribute values of the first attribute, and respective ones of the determined attribute values assigned to one or more nodes of preceding hierarchy levels, according to an order of a hierarchy of the organizational data structure, for corresponding attributes, determining at least a second attribute of a plurality of attributes of data elements stored in the data repository, determining multiple attribute values of the second attribute that appear within the data elements, determining, for each particular attribute value of the multiple attribute values of the second attribute, a numeric value representing how many data elements in a respective subset of data elements include the particular attribute value, assigning, to each of a plurality of nodes of a second hierarchy level of the organizational data structure corresponding to the second attribute, at least one of the determined attribute values of the second attribute, and respective ones of the determined attribute values assigned to one or more nodes of preceding hierarchy levels, according to an order of a hierarchy of the organizational data structure, for corresponding attributes, wherein the first attribute has a higher order than the second attribute, in response to a user input that modifies the ordering of the first and second attributes such that the second attribute has a higher order than the first attribute, dynamically updating the hierarchical data structure and grouping of the data elements, and updating, for each particular attribute value of the multiple attribute values of the first and second attributes, the numeric value representing how many data elements in a respective subset of data elements include the particular attribute value, and storing in the organizational data structure information based on the determined numeric values in association with information identifying the first and second attributes.

5. The method of claim 4, further including presenting the interface on the computing device, the interface including a first strip corresponding to the first attribute, the first strip including multiple sections, with a plurality of the multiple sections having a size that is proportional to a corresponding one of the determined numeric values.

6. The method of claim 5, wherein the interface includes a control for removing one or more of the first strip and the second strip from the interface.

7. The method of claim 5, wherein the interface includes a control for adding one or more additional strips to the interface, the one or more additional strips each being associated with an additional attribute.

8. The method of claim 5, wherein the interface further includes a second strip corresponding to the second attribute, the second strip including multiple sections.

9. The method of claim 8, wherein each section of the first and second strips represents a different respective group of the data elements.

10. The method of claim 9, wherein an ordering of the first strip with respect to the second strip specifies an order in which the data elements are grouped.

11. The method of claim 10, further including altering the ordering to alter the order in which the data elements are grouped.

12. The method of claim 9, further including generating a query in response to receiving input that includes a selection of one or more of the multiple sections, the query being associated with respective data elements of the selected one or more of the multiple sections.

13. The method of claim 12, further including altering the query in response to receiving input that selects or deselects one or more of the one or more of the multiple sections.

14. The method of claim 12, wherein the selected one or more of the multiple sections include a section of the second strip, the section of the second strip representing a subset of the data elements represented by one of the multiple sections of the first strip.

15. The method of claim 14, wherein the query is based on one or more sections in one or more strips that precede the second strip in the ordering.

16. The method of claim 12, wherein the selected one or more of the multiple sections include two sections of the second strip.

17. The method of claim 16, wherein the query includes an expression for retrieving data elements represented by a union of each of the two sections in the second strip.

18. The method of claim 12, wherein receiving input selecting one or more of the multiple sections of the first strip causes one or more sections of the multiple sections of the second strip to be selected.

19. The method of claim 5, wherein the first strip does not include respective sections for values of the first attribute that do not appear within the data elements.

20. The method of claim 8, further including updating the user interface in response to data elements being added or removed from the data repository.

21. The method of claim 20, wherein updating the user interface includes adding one or more of a strip or a section from the user interface.

22. The method of claim 20, wherein updating the user interface includes removing one or more of a strip or a section from the user interface.

23. The method of claim 8, further including identifying that a cursor is hovering over a particular section of the multiple sections of the first strip or the second strip; and, in response to the identifying, presenting information associated with the data elements associated with the particular section.

24. The method of claim 9, wherein the interface includes a control for selecting all of the sections associated with the user interface.

25. The method of claim 24, wherein the control includes a strip.

26. The method of claim 9, wherein at least one section of the multiple sections of the first strip or the second strip represents multiple attribute values.

27. A non-transitory computer-readable storage medium storing a computer program for providing an interface on a computing device for interacting with multi-dimensional data stored in a data repository, the computer program including instructions for causing a computing system to:
store on the computing device an organizational data structure having hierarchy levels; and
process data in the data repository to store information in the organizational data structure used to present the interface on the computing device, the processing including
determining at least a first attribute of a plurality of attributes of data elements stored in the data repository,
determining multiple attribute values of the first attribute that appear within the data elements,
determining, for each particular attribute value of the multiple attribute values, a numeric value representing how many data elements in a respective subset of data elements include the particular attribute value,
assigning, to each of a plurality of nodes of one of the hierarchy levels of the organizational data structure corresponding to the first attribute, at least one of the determined attribute values of the first attribute, and if the hierarchy level has one or more preceding hierarchy levels, respective ones of the determined attribute values assigned to one or more nodes of the one or more preceding hierarchy levels, according to an order of a hierarchy of the organizational data structure, for corresponding attributes, in which the order of the hierarchy levels of the organizational data structure corresponds to an order of the attributes,
determining at least a second attribute of a plurality of attributes of data elements stored in the data repository,
determining multiple attribute values of the second attribute that appear within the data elements,
determining, for each particular attribute value of the multiple attribute values of the second attribute, a numeric value representing how many data elements in a respective subset of data elements include the particular attribute value,
assigning, to each of a plurality of nodes of a second hierarchy level of the organizational data structure corresponding to the second attribute, at least one of the determined attribute values of the second attribute, and respective ones of the determined attribute values assigned to one or more nodes of preceding hierarchy levels, according to an order of a hierarchy of the organizational data structure, for corresponding attributes, wherein the first attribute has a higher order than the second attribute,
in response to a user input that modifies the ordering of the first and second attributes such that the second attribute has a higher order than the first attribute, dynamically updating the hierarchical data structure and grouping of the data elements, and updating, for each particular attribute value of the multiple attribute values of the first and second attributes, the numeric value representing how many data elements in a respective subset of data elements include the particular attribute value, and
storing in the organizational data structure information based on the determined numeric values in association with information identifying the first and second attributes.

28. A computing device for providing an interface for interacting with multi-dimensional data stored in a data repository, the computing device including:
memory storing an organizational data structure; and
at least one processor configured to process data in the data repository to store information in the organizational data structure used to present the interface on the computing device, the processing including
determining at least a first attribute of a plurality of attributes of data elements stored in the data repository,
determining multiple attribute values of the first attribute that appear within the data elements,
determining, for each particular attribute value of the multiple attribute values, a numeric value representing how many data elements in a respective subset of data elements include the particular attribute value,
assigning, to each of a plurality of nodes of a first hierarchy level of the organizational data structure corresponding to the first attribute, at least one of the determined attribute values of the first attribute, and respective ones of the determined attribute values assigned to one or more nodes of preceding hierarchy levels, according to an order of a hierarchy of the organizational data structure, for corresponding attributes, determining at least a second attribute of a plurality of attributes of data elements stored in the data repository, determining multiple attribute values of the second attribute that appear within the data elements, determining, for each particular attribute value of the multiple attribute values of the second attribute, a numeric value representing how many data elements in a respective subset of data elements include the particular attribute value, assigning, to each of a plurality of nodes of a second hierarchy level of the organizational data structure corresponding to the second attribute, at least one of the determined attribute values of the second attribute, and respective ones of the determined attribute values assigned to one or more nodes of preceding hierarchy levels, according to an order of a hierarchy of the organizational data structure, for corresponding attributes, wherein the first attribute has a higher order than the second attribute, in response to a user input that modifies the ordering of the first and second attributes such that the second attribute has a higher order than the first attribute, dynamically updating the hierarchical data structure and grouping of the data elements, and updating, for each particular attribute value of the multiple attribute values of the first and second attributes, the numeric value representing how many data elements in a respective subset of data elements include the particular attribute value, and storing in the organizational data structure information based on the determined numeric values in association with information identifying the first and second attributes.

29. A computing device for providing an interface for interacting with multi-dimensional data stored in a data repository, the computing device including:
   means for storing an organizational data structure having hierarchy levels;
   means for processing data in the data repository to store information in the organizational data structure used to present the interface on the computing device, the processing including
      determining at least a first attribute of a plurality of attributes of data elements stored in the data repository,
      determining multiple attribute values of the first attribute that appear within the data elements,
      determining, for each particular attribute value of the multiple attribute values, a numeric value representing how many data elements in a respective subset of data elements include the particular attribute value,
      assigning, to each of a plurality of nodes of one of the hierarchy levels of the organizational data structure corresponding to the first attribute, at least one of the determined attribute values of the first attribute, and if the hierarchy level has one or more preceding hierarchy levels, respective ones of the determined attribute values assigned to one or more nodes of the one or more preceding hierarchy levels, according to an order of a hierarchy of the organizational data structure, for corresponding attributes, in which the order of the hierarchy levels of the organizational data structure corresponds to an order of the attributes,
      determining at least a second attribute of a plurality of attributes of data elements stored in the data repository,
      determining multiple attribute values of the second attribute that appear within the data elements,
      determining, for each particular attribute value of the multiple attribute values of the second attribute, a numeric value representing how many data elements in a respective subset of data elements include the particular attribute value,
      assigning, to each of a plurality of nodes of a second hierarchy level of the organizational data structure corresponding to the second attribute, at least one of the determined attribute values of the second attribute, and respective ones of the determined attribute values assigned to one or more nodes of preceding hierarchy levels, according to an order of a hierarchy of the organizational data structure, for corresponding attributes, wherein the first attribute has a higher order than the second attribute,
      in response to a user input that modifies the ordering of the first and second attributes such that the second attribute has a higher order than the first attribute, dynamically updating the hierarchical data structure and grouping of the data elements, and updating, for each particular attribute value of the multiple attribute values of the first and second attributes, the numeric value representing how many data elements in a respective subset of data elements include the particular attribute value, and
      storing in the organizational data structure information based on the determined numeric values in association with information identifying the first and second attributes.

30. The computing device of claim 29, further including means for presenting the interface on the computing device, the interface including a first strip corresponding to the first attribute, the first strip including multiple sections, with a plurality of the multiple sections having a size that is proportional to a corresponding one of the determined numbers of data elements.

31. The non-transitory computer-readable storage medium of claim 27 in which the computer program includes instructions for causing the computing system to present the interface on the computing device, the interface including a first strip corresponding to the first attribute, the first strip including multiple sections, with a plurality of the multiple sections having a size that is proportional to a corresponding one of the determined numeric values.

32. The non-transitory computer-readable storage medium of claim 27, wherein the process data further includes
   for each attribute value of the first attribute,
      determine a second attribute of data elements stored in the data repository, the second attribute having a lower order than the first attribute,
      determine multiple second attribute values of the second attribute that appear within the data elements,
      determine, for each particular attribute value of the multiple second attribute values, a numeric value representing how many data elements in a respective subset of data elements include the particular attribute value of the second attribute and the attribute value of the first attribute, and
      store in the organizational data structure information based on the determined numeric values in association with information identifying the second attribute.

33. The non-transitory computer-readable storage medium of claim 32, wherein the interface further includes a second strip corresponding to the second attribute, the second strip including multiple sections.

34. The non-transitory computer-readable storage medium of claim 33, wherein each section of the first and second strips represents a different respective group of the data elements.

35. The non-transitory computer-readable storage medium of claim 27 in which the computer program includes instructions for causing the computing system to generate a query in response to receiving input that includes a selection of one or more of the multiple sections, the query being associated with respective data elements of the selected one or more of the multiple sections.

36. The non-transitory computer-readable storage medium of claim 35 in which the computer program includes instructions for causing the computing system to alter the query in response to receiving input that selects or deselects one or more of the one or more of the multiple sections.

37. The non-transitory computer-readable storage medium of claim 35, wherein the selected one or more of the multiple sections include a section of the second strip, the section of the second strip representing a subset of the data elements represented by one of the multiple sections of the first strip.

38. The non-transitory computer-readable storage medium of claim 37, wherein the query is based on one or more sections in one or more strips that precede the second strip in the ordering.

39. The non-transitory computer-readable storage medium of claim 35, wherein the selected one or more of the multiple sections include two sections of the second strip.

40. The non-transitory computer-readable storage medium of claim 39, wherein the query includes an expression for retrieving data elements represented by a union of each of the two sections in the second strip.

41. The non-transitory computer-readable storage medium of claim 35, wherein receiving input selecting one or more of the multiple sections of the first strip causes one or more sections of the multiple sections of the second strip to be selected.

42. The computing device of claim 28, comprising a display for presenting the interface, the interface including a first strip corresponding to the first attribute, the first strip including multiple sections, with a plurality of the multiple sections having a size that is proportional to a corresponding one of the determined numbers of data elements.

43. The computing device of claim 42, wherein the processing further includes
    determining a second attribute of data elements stored in the data repository,
    determining multiple second attribute values of the second attribute that appear within the data elements,
    determining, for each particular attribute value of the multiple second attribute values, a number of data elements in a respective subset of data elements that include the particular attribute value, and
    storing in the organizational data structure information based on the determined numbers of data elements in association with information identifying the second attribute.

44. The computing device of claim 43, wherein the interface further includes a second strip corresponding to the second attribute, the second strip including multiple sections.

45. The computing device of claim 44, wherein each section of the first and second strips represents a different respective group of the data elements.

46. The computing device of claim 45, wherein an ordering of the first strip with respect to the second strip specifies an order in which the data elements are grouped.

47. The computing device of claim 46 in which the processing further includes altering the ordering to alter the order in which the data elements are grouped.

48. The computing device of claim 45 in which the processing further includes generating a query in response to receiving input that includes a selection of one or more of the multiple sections, the query being associated with respective data elements of the selected one or more of the multiple sections.

49. The computing device of claim 48 in which the processing further includes altering the query in response to receiving input that selects or deselects one or more of the one or more of the multiple sections.

50. The computing device of claim 48, wherein the selected one or more of the multiple sections include a section of the second strip, the section of the second strip representing a subset of the data elements represented by one of the multiple sections of the first strip.

51. The computing device of claim 50, wherein the query is based on one or more sections in one or more strips that precede the second strip in the ordering.

52. The computing device of claim 48, wherein the selected one or more of the multiple sections include two sections of the second strip.

53. The computing device of claim 52, wherein the query includes an expression for retrieving data elements represented by a union of each of the two sections in the second strip.

54. The computing device of claim 48, wherein receiving input selecting one or more of the multiple sections of the first strip causes one or more sections of the multiple sections of the second strip to be selected.

55. A non-transitory computer-readable storage medium storing a computer program for providing an interface on a computing device for interacting with multi-dimensional data stored in a data repository, the computer program including instructions for causing a computing system to:
    receive input including
        information identifying two or more attributes of data elements stored in the data repository, and
        information indicating an order for the identified attributes, in which the two or more attributes include a first attribute and a second attribute, each of the first and second attributes has two or more attribute values;
    store, on a storage device, a hierarchical data structure, the hierarchical data structure including a hierarchy having a plurality of hierarchy levels that each corresponds to one of the identified attributes, with an order of the hierarchy levels corresponding to the indicated order for the identified attributes, and the first attribute is associated with a hierarchy level higher than the hierarchy level associated with the second attribute;
    process data in the data repository to store information in the hierarchical data structure used to present the interface on the computing device, the process including
        determine multiple attribute values that appear within the data elements, for the identified attributes,
        assign, to each of a plurality of nodes of a first hierarchy level of the hierarchical data structure corresponding to the first attribute, at least one of the determined attribute values of the first attribute, in which a first node is assigned a first attribute value of the first attribute and a second node is assigned a second attribute value of the first attribute, and assign, to each of a plurality of nodes of a second hierarchy level of the hierarchical data structure corresponding to the second attribute, at least one of the determined attribute values of the second attribute, each of the plurality of nodes of the second hierarchy level also being assigned respective ones of the determined attribute values assigned to one or more nodes of preceding hierarchy levels, according to the order of the hierarchy levels, for the corresponding attributes, in which a third node is assigned the first attribute value of the first attribute and a first attribute value of the second attribute, a fourth node is assigned the first attribute value of the first attribute and a second attribute value of the second attribute, a fifth node is assigned the second attribute value of the first attribute and a first attribute value of the second attribute, and a sixth node is assigned the second attribute value of the first attribute and the second attribute value of the second attribute; and display the interface, including displaying graphical interface elements associated with each of the nodes according to the hierarchy.

56. The non-transitory computer-readable storage medium of claim 55 in which the computer program further includes instructions for causing the computing system to generate a query in response to receiving input that includes a selection of one or more of the nodes of the data structure, each node representing data elements with the combination of attribute values assigned to that node in the hierarchy, with a set of data elements returned by the query corresponding to the union of the data elements represented by each of the individual nodes.

57. The non-transitory computer-readable storage medium of claim 55 in which the computer program further includes instructions for causing the computing system to assign, to each of a plurality of nodes of each successive hierarchy level of the hierarchical data structure corresponding to respective attributes of the identified attributes, at least one of the determined attribute values of the respective attribute, each of the plurality of nodes of each successive hierarchy level also being assigned respective ones of the determined attribute values assigned to all nodes of preceding hierarchy levels, according to the order of the hierarchy levels, for the corresponding attributes.

58. A computing device for providing an interface for interacting with multi-dimensional data stored in a data repository, the computing device including:

memory storing information identifying two or more attributes of data elements stored in the data repository, information indicating an order for the identified attributes, and a hierarchical data structure including a hierarchy having a plurality of hierarchy levels that each corresponds to one of the identified attributes, with an order of the hierarchy levels corresponding to the indicated order for the identified attributes, in which the two or more attributes include a first attribute and a second attribute, each of the first and second attributes has two or more attribute values, and the first attribute is associated with a hierarchy level higher than the hierarchy level associated with the second attribute;

at least one processor configured to process data in the data repository to store information in the hierarchical data structure used to present the interface on the computing device, the processing including determining multiple attribute values that appear within the data elements, for the identified attributes, assigning, to each of a plurality of nodes of a first hierarchy level of the hierarchical data structure corresponding to the first attribute, at least one of the determined attribute values of the first attribute, in which a first node is assigned a first attribute value of the first attribute and a second node is assigned a second attribute value of the first attribute, and assigning, to each of a plurality of nodes of a second hierarchy level of the hierarchical data structure corresponding to the second attribute, at least one of the determined attribute values of the second attribute, each of the plurality of nodes of the second hierarchy level also being assigned respective ones of the determined attribute values assigned to one or more nodes of preceding hierarchy levels, according to the order of the hierarchy levels, for the corresponding attributes, in which a third node is assigned the first attribute value of the first attribute and a first attribute value of the second attribute, a fourth node is assigned the first attribute value of the first attribute and a second attribute value of the second attribute, a fifth node is assigned the second attribute value of the first attribute and a first attribute value of the second attribute, and a sixth node is assigned the second attribute value of the first attribute and the second attribute value of the second attribute; and a display to display the interface, including displaying graphical interface elements associated with each of the nodes according to the hierarchy.

59. The computing device of claim 58 in which the processing includes generating a query in response to receiving input that includes a selection of one or more of the nodes of the data structure, each node representing data elements with the combination of attribute values assigned to that node in the hierarchy, with a set of data elements returned by the query corresponding to the union of the data elements represented by each of the individual nodes.

60. The computing device of claim 58 in which the processing includes assigning, to each of a plurality of nodes of each successive hierarchy level of the hierarchical data structure corresponding to respective attributes of the identified attributes, at least one of the determined attribute values of the respective attribute, each of the plurality of nodes of each successive hierarchy level also being assigned respective ones of the determined attribute values assigned to all nodes of preceding hierarchy levels, according to the order of the hierarchy levels, for the corresponding attributes.

61. A computing device for providing an interface for interacting with multi-dimensional data stored in a data repository, the computing device including:

means for receiving input including
information identifying two or more attributes of data elements stored in the data repository, and
information indicating an order for the identified attributes, in which the two or more attributes include a first attribute and a second attribute, each of the first and second attributes has two or more attribute values;

means for storing a hierarchical data structure, the hierarchical data structure including a hierarchy having a plurality of hierarchy levels that each corresponds to one of the identified attributes, with an order of the hierarchy levels corresponding to the indicated order for the identified attributes, and the first attribute is associated with a hierarchy level higher than the hierarchy level associated with the second attribute;

means for processing data in the data repository to store information in the hierarchical data structure used to present the interface on the computing device, the process including means for determining multiple attribute values that appear within the data elements, for the identified attributes, means for assigning, to each of a plurality of nodes of a first hierarchy level of the hierarchical data structure corresponding to the first attribute, at least one of the determined attribute values of the first attribute, in which a first node is assigned a first attribute value of the first attribute and a second node is assigned a second attribute value of the first attribute, and means for assigning, to each of a plurality of nodes of a second hierarchy level of the hierarchical data structure corresponding to the second attribute, at least one of the determined attribute values of the second attribute, each of the plurality of nodes of the second hierarchy level also being assigned respective ones of the determined attribute values assigned to one or more nodes of preceding hierarchy levels, according to the order of the hierarchy levels, for the corresponding attributes, in which a third node is assigned the first attribute value of the first attribute and a first attribute value of the second attribute, a fourth node is assigned the first attribute value of the first attribute and a second attribute value of the second attribute, a fifth node is assigned the second attribute value of the first attribute and a first attribute value of the second attribute, and a sixth node is assigned the second attribute value of the first attribute and the second attribute value of the second attribute; and means for displaying the interface, including displaying graphical interface elements associated with each of the nodes according to the hierarchy.

62. The computing device of claim 61, comprising means for generating a query in response to receiving input that includes a selection of one or more of the nodes of the data structure, each node representing data elements with the combination of attribute values assigned to that node in the hierarchy, with a set of data elements returned by the query corresponding to the union of the data elements represented by each of the individual nodes.

63. A computer-implemented method comprising:

receiving, at a data processor, information identifying two or more attributes of data elements and information indicating an order for the identified attributes;

storing, on a storage device, a hierarchical data structure representing an organization of the data elements, the hierarchical data structure having nodes that form hierarchy levels, each hierarchy level corresponding to one of the identified attributes, wherein an order of the hierarchy level corresponds to the indicated order for the identified attributes, each node is associated with an attribute value of the attribute corresponding to the hierarchy level of the node and, if the node has a parent node, attribute value or values associated with the parent node, and each node represents data elements having the attribute values associated with the node;

providing an interface to show the hierarchical data structure;

in response to user input modifying an order of the identified attributes, dynamically updating an order of the hierarchy levels according to the modified order of the identified attributes, and dynamically updating grouping of the data elements according to the modified order of the identified attributes, in which a first hierarchy level initially associated with a first attribute and a second hierarchy level initially associated with a second attribute are modified such that the first hierarchy level is associated with the second attribute and the second hierarchy level is associated with the first attribute, and in which the dynamically updating includes at the first hierarchy level, grouping the data elements according to subsets that are formed according to attribute values of the second attribute, and at the second hierarchy level, grouping the data elements according to subsets that are formed according to attribute values of the second attribute, and within each subset grouping the data elements according to attribute values of the first attribute; and responsive to input selecting one or more of the nodes, generating a query based on the selected node or nodes to retrieve a set of the data elements that correspond to a union of the data elements represented by each of the selected nodes.

64. The method of claim 63, further comprising providing an interface that includes a first strip corresponding to the first attribute and a second strip corresponding to the second attribute, the first strip representing a first grouping of the data elements according to the first attribute, the second strip representing a second grouping of the data elements according to the first and second attributes, the ordering of the first and second strips corresponding to an order of the first and second attributes.

65. The method of claim 63, comprising, for the identified attributes, determining attribute values that appear within the data elements, and prior to receiving the user input that modifies the ordering of the first and second attributes, for each node of the first hierarchy level, associating the node with at least one of the determined attribute values of the first attribute, and for each node of the second hierarchy level, associating the node with at least one of the determined attribute values of the second attribute, wherein dynamically updating the hierarchical data structure comprises for each node of the first hierarchy level, associating the node with at least one of the determined attribute values of the second attribute, and for each node of the second hierarchy level, associating the node with at least one of the determined attribute values of the first attribute.

66. The method of claim 65, comprising determining, for each particular attribute value of the attribute values, a numeric value representing how many data elements in a respective subset of data elements that include the particular attribute value.

67. The method of claim 66, further comprising providing an interface that includes a first strip corresponding to the first attribute, the first strip including sections, each of some of the sections having a size that is proportional to a corresponding one of the determined numbers of data elements.

68. The method of claim 63, further comprising providing an interface to show the hierarchical data structure in which the interface shows only non-empty groupings of the data elements.

69. The method of claim 63, comprising altering the query in response to receiving input that selects or deselects one or more of the nodes.

70. The method of claim 63, comprising dynamically updating the interface to show changes in the nodes in response to changes in the attribute values of the data elements.

71. The method of claim 63, comprising dynamically updating the grouping of the data elements in response to changes in the attribute values of the data elements.

72. A computer-implemented method comprising:
receiving, at a data processor, information identifying two or more attributes of data elements and information indicating an order for the identified attributes, in which the two or more attributes include a first attribute and a second attribute, each of the first and second attributes has two or more attribute values;
storing, on a storage device, a hierarchical data structure having nodes that form hierarchy levels, each hierarchy level corresponding to one of the identified attributes, in which an order of the hierarchy level corresponds to the indicated order for the identified attributes, and the first attribute is associated with a hierarchy level higher than the hierarchy level associated with the second attribute;
at each particular hierarchy level of the hierarchy levels, grouping the data elements according to subsets that are formed according to attribute values of an attribute associated with a hierarchy level above the particular hierarchy level, and within each subset grouping the data elements according to attribute values of an attribute associated with the particular hierarchy level, in which for the hierarchy level associated with the second attribute, the data elements are grouped into subsets according to attribute values of the first attribute, the subsets including a first subset and a second subset, the data elements within the first subset are grouped according attribute values of the second attribute, the data elements within the second subset are also grouped according the attribute values of the second attribute, and some of the attribute values used to group the data elements within the first subset are the same as some of the attribute values used to group the data elements within the second subset; and
dynamically updating the grouping of the data elements in response to changes in the attribute values of the data elements.

73. The method of claim 72, comprising providing an interface to show the hierarchical data structure, and dynamically updating the interface in response to changes in the attribute values of the data elements.

74. The method of claim 73 in which the interface comprises strips each corresponding to one of the attributes, each strip including sections each corresponding to one of the attribute values.

75. The method of claim 74, comprising dynamically updating the sections in the interface in response to the changes in the attribute values of the data elements.

76. The method of claim 75, comprising automatically adding a section in the interface in response to introduction of data indicating a new attribute value in the data elements.

77. The method of claim 72, comprising:
for each hierarchical level and for each attribute value of the attribute associated with the hierarchy level, determining a number of data elements in a respective grouping of data elements that is grouped according to the attribute value;
providing an interface to show the hierarchical data structure, the interface comprising strips each corresponding to one of the attributes, each strip including sections each corresponding to one of the attribute values, each section having a size that is proportional to a corresponding one of the determined numbers of data elements; and
dynamically updating the sizes of the sections in response to changes in the determined numbers of data elements in the groupings corresponding to the sections.

78. The method of claim 1, including for each of the plurality of nodes of the first hierarchy level of the hierarchical data structure corresponding to the first attribute, determining a measurement value associated with the data elements in a respective subset of data elements associated with the particular attribute value that is assigned to the node, in which determining the measurement value includes determining at least one of an average duration, a maximum duration, an average CPU usage, or a maximum CPU usage for the data elements that have the particular attribute value.

* * * * *